US012763973B2

(12) United States Patent
Trampuš et al.

(10) Patent No.: US 12,763,973 B2
(45) Date of Patent: Oct. 13, 2026

(54) METHODS AND SYSTEMS FOR FREEZING DIGITAL ASSETS

(71) Applicant: nChain Licensing AG, Zug (CH)

(72) Inventors: Matej Trampuš, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 18/867,780

(22) PCT Filed: Jun. 2, 2023

(86) PCT No.: PCT/EP2023/064857
§ 371 (c)(1),
(2) Date: Nov. 20, 2024

(87) PCT Pub. No.: WO2023/233013
PCT Pub. Date: Dec. 7, 2023

(65) Prior Publication Data

US 2025/0350477 A1 Nov. 13, 2025

Related U.S. Application Data

(60) Provisional application No. 63/348,262, filed on Jun. 2, 2022.

(51) Int. Cl.
*H04L 9/40* (2022.01)
*G06Q 20/22* (2012.01)
(Continued)

(52) U.S. Cl.
CPC ......... *H04L 9/3255* (2013.01); *G06Q 20/223* (2013.01); *G06Q 20/389* (2013.01); *H04L 9/50* (2022.05); *H04L 2209/56* (2013.01)

(58) Field of Classification Search
CPC ...... H04L 9/3255; H04L 9/50; H04L 2209/56
See application file for complete search history.

(56) References Cited

U.S. PATENT DOCUMENTS 11,799,637 B2 * 10/2023 Fletcher ................ H04L 9/0825
12,177,364 B2 * 12/2024 Chan .................. G06Q 20/0655
(Continued)

FOREIGN PATENT DOCUMENTS

CN 111131218 A 5/2020
CN 112968901 A 6/2021
GB 2595488 A 12/2021

OTHER PUBLICATIONS

PCT/EP2023/064857 International Search Report and Written Opinion dated Sep. 19, 2023, 17 pages.
(Continued)

*Primary Examiner* — Scott S Trotter
(74) *Attorney, Agent, or Firm* — Rowan P. Smith; Galvani Smith PLLC

(57) ABSTRACT

Systems and computer-implemented methods for freezing or unfreezing digital assets on a blockchain. A freeze administration service may send a signed freeze request to mining nodes, which maintain two blacklists of digital asset identifiers: a pending blacklist and a consensus blacklist. The digital asset identifiers may be transaction outpoints in some cases. If accepted by the mining node, the transaction outpoints in the freeze request are added to the pending blacklist, which causes rejection of any transactions using those outpoints, but does not cause rejection of any new blocks that include transactions using those outpoints. If a consensus threshold of acceptances is reached based on hash power, the request becomes an order and the outpoints are added to the consensus blacklist, which causes rejection of any transaction or block containing a transaction using those outpoints.

20 Claims, 10 Drawing Sheets

(51) Int. Cl.
*G06Q 20/38* (2012.01)
*H04L 9/00* (2022.01)
*H04L 9/32* (2006.01)

(56) References Cited

U.S. PATENT DOCUMENTS 12,476,819 B2 * 11/2025 Aspler-Yaskil ....... H04L 9/0891
2021/0176058 A1 * 6/2021 Cheng .................. H04L 9/0894

OTHER PUBLICATIONS

EP Application No. 26176880.8 Extended European Search Report dated Jun. 18, 2026, 10 pages.

* cited by examiner

METHODS AND SYSTEMS FOR FREEZING DIGITAL ASSETS

CROSS REFERENCE TO RELATED APPLICATIONS

This application is the U.S. National Stage of International Application No. PCT/EP2023/064857 filed on Jun. 2, 2023, which claims the benefit of U.S. Provisional Patent Application No. 63/348,262 filed on Jun. 2, 2022, the contents of which are all incorporated herein by reference in their entireties.

TECHNICAL FIELD

The present disclosure relates to blockchain networks and, in particular, to methods and devices for generating and implementing freeze operations with regards to digital assets recorded on the blockchain network

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicised. The transactions in the blockchain are used to perform one or more of the following: to convey a digital asset (i.e. a number of digital tokens), to order a set of journal entries in a virtualised ledger or registry, to receive and process timestamp entries, and/or to time-order index pointers.

In an "output-based" model (sometimes referred to as a UTXO-based model), the data structure of a given transaction includes one or more inputs and one or more outputs. Any spendable output includes an element specifying an amount of the digital asset that is derivable from the proceeding sequence of transactions. The spendable output is sometimes referred to as a UTXO ("unspent transaction output") or an "outpoint". In some cases, the protocol may not refer to "outputs" or "outpoints", but may instead refer to sender addresses and receiver addresses. The output may further include a locking script specifying a condition for the future redemption of the output. A locking script is a predicate defining the conditions necessary to validate and transfer digital tokens or assets. Each input of a transaction (other than a coinbase transaction) includes a pointer (i.e. a reference) to such an output in a preceding transaction, and may further include an unlocking script for unlocking the locking script of the pointed-to output.

One of the principal attractions of blockchain technology, particularly in the cryptocurrency community, is its distributed, consensus-based enforcement mechanism that eliminates the need for a trusted authority or intermediary for transactions. However this creates a problem when fraud or theft occurs in that there is no available mechanism for freezing digital assets or unwinding or undoing a transaction in stolen assets without imposing a network-wide software change and/or rolling-back mined blocks.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLES

Figure 1:
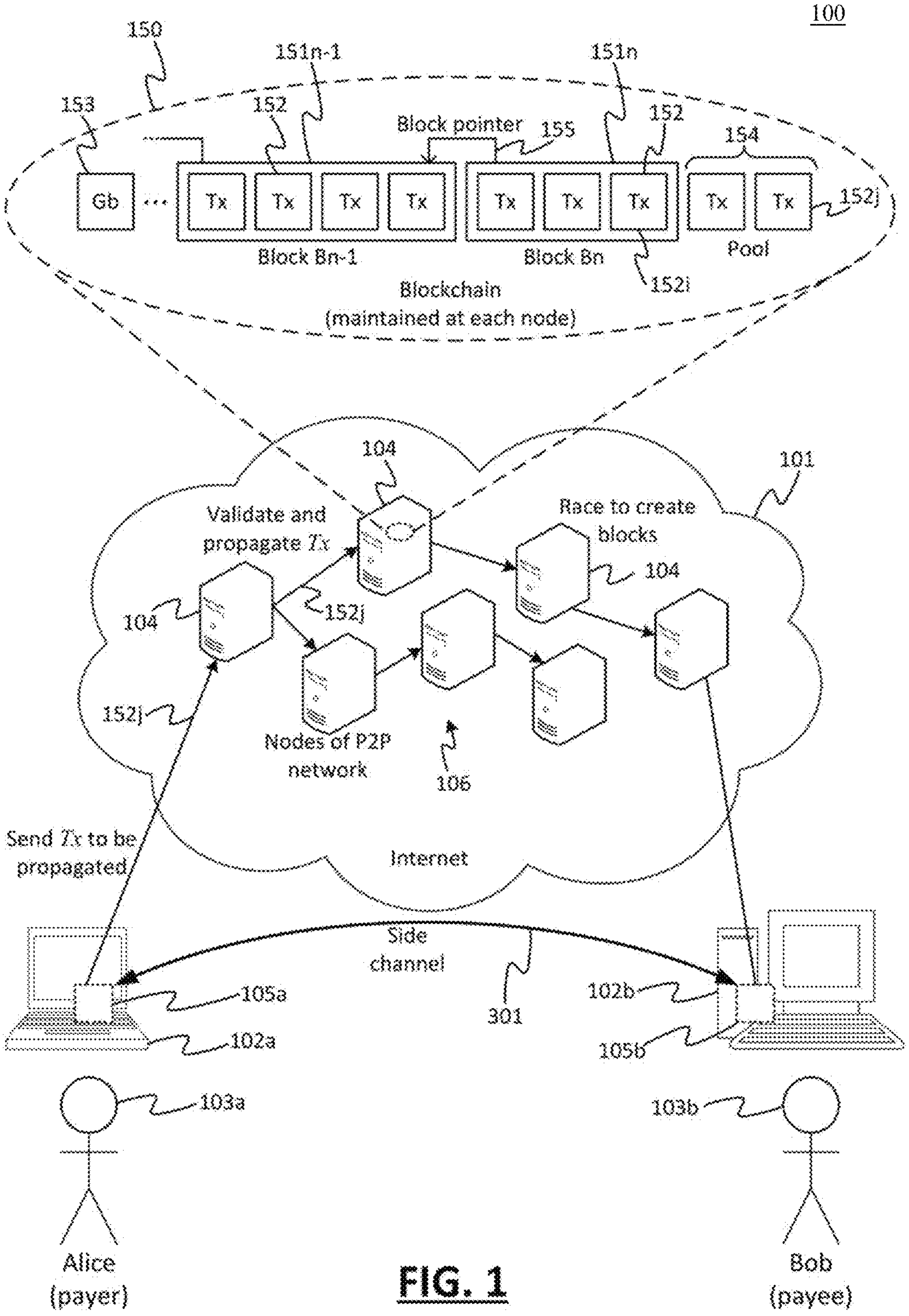
FIG. 1 shows an example system for implementing a blockchain.

In one aspect, there may be provided a computer-implemented method of freezing digital assets at a mining node in a blockchain network. The method may include receiving and validating a freeze request message from a freeze administration service, the freeze request message including one or more digital asset identifiers; adding the one or more digital asset identifiers to a pending blacklist stored at the mining node, wherein new transactions received over the blockchain network that include identifiers on the pending blacklist are rejected by the mining node but new blocks received over the blockchain network that include identifiers on the pending blacklist are acceptable; receiving and validating a freeze order from the freeze administration service, the freeze order identifying the freeze request message; and responsive to the freeze order, adding the one or more digital asset identifiers to a consensus blacklist, wherein subsequent transactions that include identifiers on the consensus blacklist and subsequent blocks that include identifiers on the consensus blacklist are both rejected by the mining node.

In some implementations, the method may further include, responsive to receiving and validating the freeze request message, generating an acceptance message regarding the freeze request message, digitally signing the acceptance message using a key associated with the mining node to generate a signed acceptance message, and sending the signed acceptance message to the freeze administration service.

In some implementations, the digital asset identifiers include transaction outpoint identifiers.

In some implementations, the method may further include, after receiving and validating the freeze request message and before receiving and validating the freeze order, receiving a new transaction over the blockchain network; determining that the new transaction has at least one of the one or more digital asset identifiers on the pending blacklist as an input and, responsive thereto, rejecting the new transaction.

In some implementations, the method may further include, after receiving and validating the freeze request message and before receiving and validating the freeze order: identifying a new block mined by another mining node; determining that at least one transaction in the new block has at least one of the one or more digital asset identifiers on the pending blacklist as an input; and validating and propagating the new block in accordance with a blockchain protocol governing the blockchain network despite the one or more digital asset identifiers on the pending blacklist.

In some implementations, the method may further include, responsive to the freeze request message, identifying and removing from a mempool of pending transactions any transactions that have at least one of the one or more digital asset identifiers as an input.

In some implementations, the method may further include, before receiving and validating the freeze order, receiving and validating an unfreeze request message from the freeze administration service, the unfreeze request message identifying the freeze request message and, responsive thereto, removing the one or more digital asset identifiers from the pending blacklist.

In some implementations, the method may further include, after receiving and validating the freeze order, receiving and validating an unfreeze request message from the freeze administration service, the unfreeze request message identifying the freeze request message; sending an acceptance message to the freeze administration service regarding the unfreeze request message; later receiving and validating an unfreeze order referencing the unfreeze request message; and, responsive thereto, removing the one or more digital asset identifiers from the consensus blacklist and from the pending blacklist.

In another aspect, the present application discloses a computer-implemented method of freezing digital assets at mining nodes in a blockchain network. The method may include generating a freeze request message at a freeze administration service, the freeze request message including one or more digital asset identifiers; transmitting the freeze request message to a plurality of the mining nodes; receiving and validating acceptance messages in reply to the freeze request message from a set of the plurality of the mining nodes, each acceptance message being associated with one mining node in the set of the plurality of mining nodes; determining that the set of the plurality of the mining nodes represent more than a consensus threshold quantity of hash power in the blockchain network; and in response, generating and sending a freeze order to the plurality of mining nodes to cause the rejection of new blocks containing transactions that use any of the one or more digital asset identifiers.

In some implementations, the one or more digital asset identifiers include one or more transaction outpoint identifiers. In some cases, the method may further include first receiving an order from a client device, the order including one or more addresses, and identifying the one or more transaction outpoint identifiers based on the one or more addresses using a blockchain address indexer.

In some implementations, determining that the set of the plurality of the mining nodes represent more than the consensus threshold quantity of hash power in the blockchain network includes determining that a number of blocks in a window of recently-mined blocks that were mined by one of the mining nodes in the set exceeds a threshold consensus number. In some cases, the method may further include identifying the mining nodes in the set by identifying, for each acceptance message, a respective public key associated with a respective digital signature on that acceptance message; and detecting an association between a block in the window of recently-mined blocks and one of the mining nodes in the set by matching the respective public key to a public key in a coinbase transaction in that block.

In some implementations, determining that the set of the plurality of the mining nodes represent more than a consensus threshold quantity of hash power in the blockchain network is triggered by receipt of a new acceptance message.

In some implementations, determining that the set of the plurality of the mining nodes represent more than a consensus threshold quantity of hash power in the blockchain network is triggered by identifying a newly-mined block on the blockchain network.

In a further aspect, the present application describes a computing device having memory, one or more processors, and computer-executable instructions stored in the memory that, when executed by the one or more processors, cause the one or more processors to carry out at least one of the methods described herein.

In yet another aspect, there may be provided a computer-readable medium storing processor-executable instructions that, when executed by one or more processors, cause the processors to carry out at least one of the methods described herein.

Other example embodiments of the present disclosure will be apparent to those of ordinary skill in the art from a review of the following detailed description in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Some of the examples provided below will illustrate concepts using the Bitcoin protocol as an illustrative example. It should be understood that the present application is not limited to implementations using that protocol and that the present application may be applied to other blockchain protocols, such as account-based protocols, including Ethereum or others. To the extent that certain terms are considered limited to UTXO-based blockchains, they should be understood to have a non-protocol specific definition. For example, the terms "transaction outpoint" or "transaction outpoint identifier" should be understood as referring to an identifier of a specific "spendable" or transferrable digital asset that results from a blockchain transaction. The transaction outpoint or transaction outpoint identifier typically has one or more conditions associated with the ability to spend or transfer that asset, such as validation of a digital signature associated with the wallet address to which that transaction outpoint refers. The term "digital asset identifier" may be used to refer to transaction outpoints, wallet addresses, public keys from which wallet addresses are derivable, or other identifiers that may be used in a given blockchain protocol to pinpoint the sender of a digital asset and the recipient of a digital asset in a transaction.

Example System Overview

FIG. 1 shows an example system 100 for implementing a blockchain 150. The system 100 may include a packet-switched network 101, typically a wide-area internetwork such as the Internet. The packet-switched network 101 includes a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 includes computer equipment of a peer, with different ones of the nodes 104 belonging to different peers. Each blockchain node 104 includes a processing apparatus implemented by one or more processors, e.g. one or more central processing units (CPUs), accelerator processors, application specific processors and/or field programmable gate arrays (FPGAs), and other equipment such as Application Specific Integrated Circuits (ASICs). Each node also includes memory, i.e. computer-readable storage in the form of a non-transitory computer-readable medium or media. The memory may include one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 includes a chain of blocks of data 151, wherein a respective copy of the blockchain 150 is maintained at each of a plurality of blockchain nodes 104 in the distributed or blockchain network 160. As mentioned above, maintaining a copy of the blockchain 150 does not necessarily mean storing the blockchain 150 in full. Instead, the blockchain 150 may be pruned of data so long as each blockchain node 150 stores the blockheader (discussed below) of each block 151. Each block 151 in the chain includes one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 has at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also includes a block pointer 155 pointing back to the previously created block 151 in the chain so as to define a sequential order to the blocks 151. Each transaction 152 (other than a coinbase transaction) has a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set 154 of transactions 152 waiting to be incorporated into blocks 151. The ordered set 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction **152*j*, the (or each) input includes a pointer referencing the output of a preceding transaction 152*i* in the sequence of transactions, specifying that this output is to be redeemed or "spent" in the present transaction 152*j*. In general, the preceding transaction could be any transaction in the ordered set 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i*** could equally be called the antecedent or predecessor transaction.

The input of the present transaction **152*j* also includes the input authorisation, for example the signature of the user 103*a* to whom the output of the preceding transaction 152*i* is locked. In turn, the output of the present transaction 152*j* can be cryptographically locked to a new user or entity 103*b*. The present transaction 152*j* can thus transfer the amount defined in the input of the preceding transaction 152*i* to the new user or entity 103*b* as defined in the output of the present transaction 152*j*. In some cases a transaction 152 may have multiple outputs to split the input amount between multiple users or entities (one of whom could be the original user or entity 103*a*** in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when an entity, such as a user or machine, 103 wishes to enact a new transaction **152*j*, then the entity sends the new transaction from its computer terminal 102 to a recipient. The entity or the recipient will eventually send this transaction to one or more of the blockchain nodes 104 of the network 106 (which nowadays are typically servers or data centres, but could in principle be other user terminals). It is also not excluded that the entity 103 enacting the new transaction 152*j* could send the transaction to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152*j* matches the expected signature, which depends on the previous transaction 152*i* in an ordered sequence of transactions 152. In such an output-based transaction protocol, this may include checking that the cryptographic signature or other authorisation of the entity 103 included in the input of the new transaction 152*j* matches a condition defined in the output of the preceding transaction 152*i* which the new transaction assigns, wherein this condition typically includes at least checking that the cryptographic signature or other authorisation in the input of the new transaction 152*j* unlocks the output of the previous transaction 152*i* to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated throughout the network of blockchain nodes 104**.

In an output-based model, the definition of whether a given output (e.g. UTXO) is assigned is whether it has yet been validly redeemed by the input of another, onward transaction **152*j* according to the blockchain node protocol. Another condition for a transaction to be valid is that the output of the preceding transaction 152*i* which it attempts to assign or redeem has not already been assigned/redeemed by another transaction. Again if not valid, the transaction 152*j* will not be propagated (unless flagged as invalid and propagated for alerting) or recorded in the blockchain 150**. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered set 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this includes searching for a "nonce" value such that when the nonce is concatenated with a representation of the ordered set of transactions 154 and hashed, then the output of the hash meets a predetermined condition. For example, the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block **151*n* pointing back to the previously created block 151*n*−1 in the chain. A significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106**, this therefore provides an immutable public ledger of the transactions.

Note that different blockchain nodes 104 racing to solve the puzzle at any given time may be doing so based on different snapshots of the ordered set of yet to be published transactions 154 at any given time, depending on when they started searching for a solution or the order in which the transactions were received. Whoever solves their respective puzzle first defines which transactions 152 are included in the next new block **151*n* and in which order, and the current set 154 of unpublished transactions is updated. The blockchain nodes 104 then continue to race to create a block from the newly-defined outstanding ordered set of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150**. Note this should not affect the users or agents of the network as the same transactions will appear in both forks.

According to the bitcoin blockchain (and most other blockchains) a node that successfully constructs a new block 104 is granted the ability to assign an accepted amount of the digital asset in a new special kind of transaction which distributes a defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction". It typically forms the first transaction of the new block **151*n*. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151*n*** in which that transaction was published. This fee is normally referred to as the "transaction fee", and is discussed below.

Due to the resources involved in transaction validation and publication, typically at least each of the blockchain nodes 104 takes the form of a server that includes one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network but do not participate in validating, constructing or propagating transactions and blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103*a* and his/her respective computer equipment 102*a*, and a second party 103*b* and his/her respective computer equipment 102*b*. It will be understood that many more such parties 103 and their respective computer equipment 102 may be present and participating in the system 100, but for convenience they are not illustrated. Each party 103 may be an individual or an organization. Purely by way of illustration the first party 103*a* is referred to herein as Alice and the second party 103*b* is referred to as Bob, but it will be appreciated that this is not limiting and any reference herein to Alice or Bob may be replaced with "first party" and "second "party" respectively.

The computer equipment 102 of each party 103 comprises respective processing apparatus including one or more processors, e.g. one or more CPUs, GPUs, other accelerator processors, application specific processors, and/or FPGAs. The computer equipment 102 of each party 103 further includes memory, i.e. computer-readable storage in the form of a non-transitory computer-readable medium or media. This memory may include one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software such as a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 includes at least one user terminal, e.g. a desktop or laptop computer, a tablet, a smartphone, or a wearable device such as a smartwatch. The computer equipment 102 of a given party 103 may also include one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 includes at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality includes collating the amounts defined in the outputs of the various 152 transactions scattered throughout the blockchain 150 that belong to the party in question.

It will be understood that whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152*j* to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152*j*, it handles it in accordance with the blockchain node protocol and its respective role. This may include first checking whether the newly received transaction 152*j* meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction **152*j* passes the test for being deemed valid (i.e. on condition that it is "validated"), any blockchain node 104 that receives the transaction 152*j* will add the new validated transaction 152 to the ordered set of transactions 154 maintained at that blockchain node 104. Further, any blockchain node 104 that receives the transaction 152*j* will propagate the validated transaction 152 onward to one or more other blockchain nodes 104 in the network 106. Since each blockchain node 104 applies the same protocol, then assuming the transaction 152*j* is valid, this means it will soon be propagated throughout the whole network 106**.

Once admitted to the ordered set of transactions 154 maintained at a given blockchain node 104, that blockchain node 104 will start competing to solve the proof-of-work puzzle on the latest version of their respective ordered set of transactions 154 including the new transaction 152 (recall that other blockchain nodes 104 may be trying to solve the puzzle based on a different ordered set of transactions 154, but whoever gets there first will define the ordered set of transactions that are included in the latest block 151, and eventually a blockchain node 104 will solve the puzzle for a part of the ordered set 154 which includes Alice's transaction **152*j*). Once the proof-of-work has been done for the ordered set 154 including the new transaction 152*j*, it immutably becomes part of one of the blocks 151 in the blockchain 150. Each transaction 152** includes a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-Based Model

Figure 2:
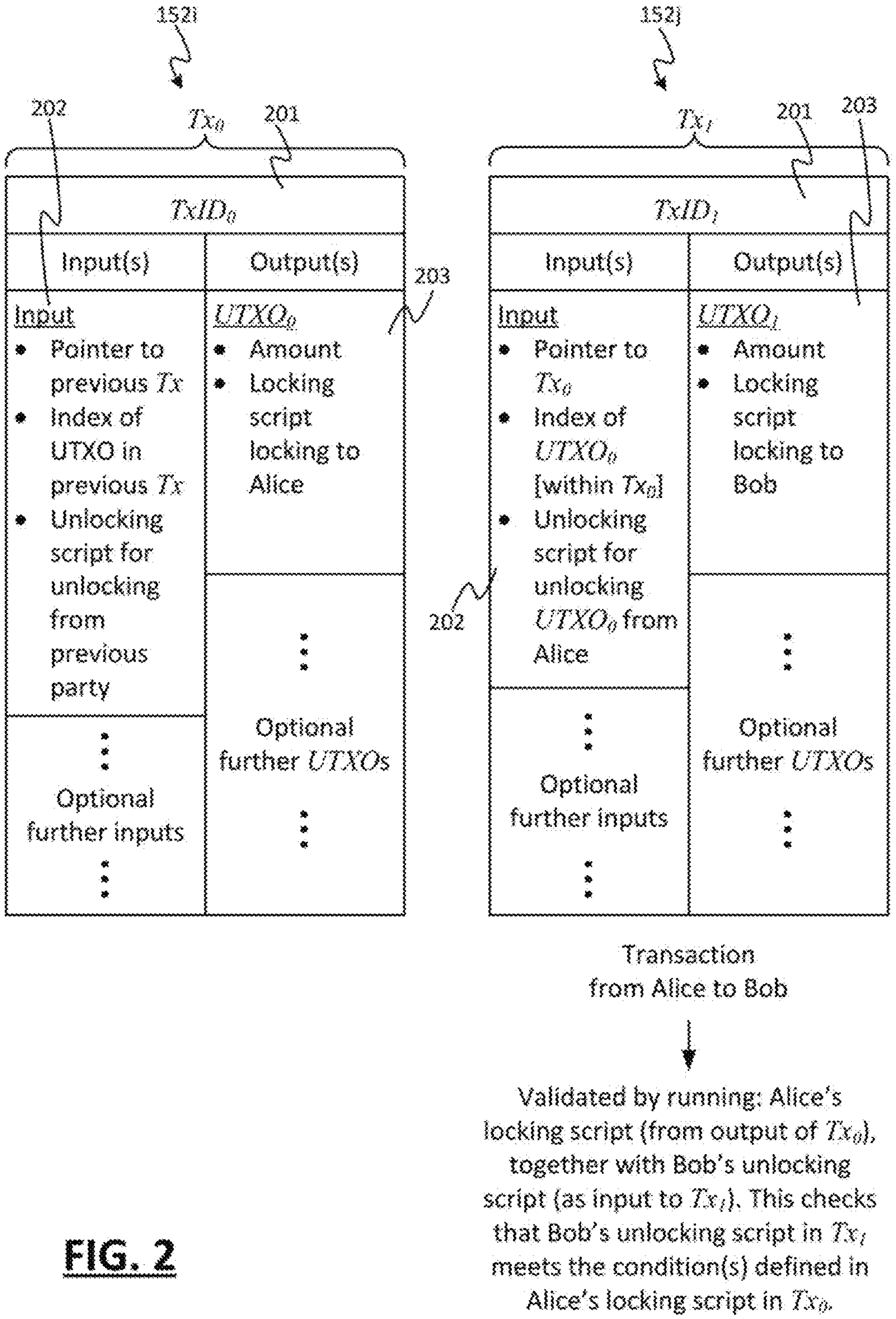
FIG. 2 illustrates an example transaction protocol.

FIG. 2 illustrates an example transaction protocol. This is an example of a UTXO-based protocol. A transaction 152 (abbreviated "Tx") is the fundamental data structure of the blockchain 150 (each block 151 containing one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 is a data structure having one or more inputs 202, and one or more outputs 203. Each output 203 may include an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also include a header 201, which may include an indicator of the size of the input field(s) 202 and output field(s) 203. The header 201 may also include an ID of the transaction. In some embodiments, the transaction ID is the hash of the transaction data (excluding the transaction ID itself).

Say Alice **103*a* wishes to create a transaction 152*j* transferring an amount of the digital asset in question to Bob 103*b*. In FIG. 2 Alice's new transaction 152*j* is labelled "$Tx_1$". It takes an amount of the digital asset that is locked to Alice in the output 203 of a preceding transaction 152*i* in the sequence, and transfers at least some of this to Bob. The preceding transaction 152*i* is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203** locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ is a particular UTXO, labelled here $UTXO_0$. Each UTXO includes a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). That is, the locking script defines an unlocking condition, typically include a condition that the unlocking script in the input of the subsequent transaction include the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Locking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ includes a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ includes a pointer pointing back to $Tx_0$ (e.g. by means of its transaction ID, $TxID_0$, which in some embodiments is the hash of the whole transaction $Tx_0$). The input 202 of $Tx_1$ includes an index identifying $UTXO_0$ within $Tx_0$, to identify it amongst any other possible outputs of $Tx_0$. The input 202 of $Tx_1$ further includes an unlocking script <Sig $P_A$> which has a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This may include running the locking script and unlocking script together to check whether the unlocking script meets the condition defined in the locking script (where this condition may include one or more criteria). In some embodiments this may involve concatenating the two scripts:

<Sig $P_A$> <$P_A$>||[Checksig $P_A$]

where "||" represents a concatenation and "< . . . >" means place the data on the stack, and "[ . . . ]" is a function carried out by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In one embodiment the signed data includes the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically includes hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered set of transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice, a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However, the amount from the UTXO can be split between multiple outputs of the next transaction. For example, the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node that publishes her transaction 104. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. For example, say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that publishes the block containing $UXTO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence, typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP . . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. For example, the data could include a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically includes the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed includes authenticating a signature. More generally the scripting language could be used to define any one or more conditions. Hence the more general terms "locking script" and "unlocking script" may be preferred.

As shown in FIG. 1, the client application on each of Alice and Bob's computer equipment 102*a*, 120*b*, respectively, may include additional communication functionality. This additional functionality enables Alice 103*a* to establish a separate side channel 301 with Bob 103*b* (at the instigation of either party or a third party). The side channel 301 enables exchange of data separately from the blockchain network. Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 301 may be used to exchange any other transaction related data, such as keys, negotiated amounts or terms, data content, etc.

The side channel 301 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102*a*, 102*b*. Generally, the side channel 301 as referred to anywhere herein may include any one or more links via one or more networking technologies or communication media for exchanging data "off-chain", i.e. separately from the blockchain network 106. Where more than one link is used, then the bundle or collection of off-chain links as a whole may be referred to as the side channel 301. Note therefore that if it is said that Alice and Bob exchange certain pieces of information or data, or such like, over the side channel 301, then this does not necessarily imply all these pieces of data have to be send over exactly the same link or even the same type of network.

Client Software

Figure 3A:
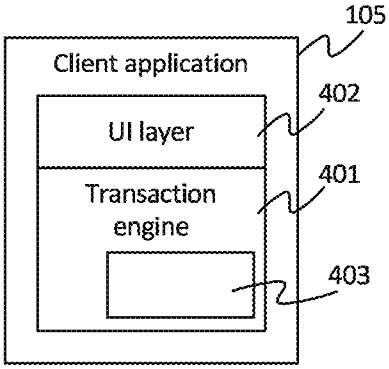
FIG. 3A shows an example implementation of a client application.

FIG. 3A illustrates an example implementation of the client application 105 for implementing embodiments of the presently disclosed scheme. The client application 105 may include a transaction engine 401 and a user interface (UI) layer 402. The transaction engine 401 is configured to implement the underlying transaction-related functionality of the client 105, such as to formulate transactions 152, receive and/or send transactions and/or other data over the side channel 301, and/or send transactions to one or more nodes 104 to be propagated through the blockchain network 106, in accordance with the processes discussed above.

The UI layer 402 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could include one or more display screens (touch or non-touch screen) for providing a visual output, one or more speakers for providing an audio output, and/or one or more haptic output devices for providing a tactile output, etc. The user input means could include for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note that whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of the transaction engine 401 may be implemented in a separate application than the UI layer 402, or the functionality of a given module such as the transaction engine 401 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 3B:
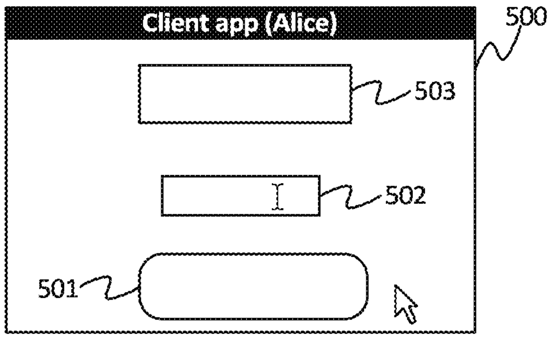
FIG. 3B shows an example of a user interface for the client application.

FIG. 3B gives a mock-up of an example of the user interface (UI) 500 which may be rendered by the UI layer 402 of the client application 105*a* on Alice's equipment 102*a*. It will be appreciated that a similar UI may be rendered by the client 105*b* on Bob's equipment 102*b*, or that of any other party.

By way of illustration FIG. 3B shows the UI 500 from Alice's perspective. The UI 500 may include one or more UI elements 501, 502, 502 rendered as distinct UI elements via the user output means.

For example, the UI elements may include one or more user-selectable elements 501 which may be, such as different on-screen buttons, or different options in a menu, or such like. The user input means is arranged to enable the user 103 (in this case Alice 103*a*) to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands).

Alternatively or additionally, the UI elements may include one or more data entry fields 502. These data entry fields 502 are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may include one or more information elements 503 output to output information to the user. For example, the information could be rendered on screen or audibly.

It will be appreciated that the particular means of rendering the various UI elements, selecting the options and entering data is not material. The functionality of these UI elements will be discussed in more detail shortly. It will also be appreciated that the UI 500 shown in FIG. 3B is only a schematized mock-up and in practice it may include one or more further UI elements, which for conciseness are not illustrated.

Node Software

Figure 4:
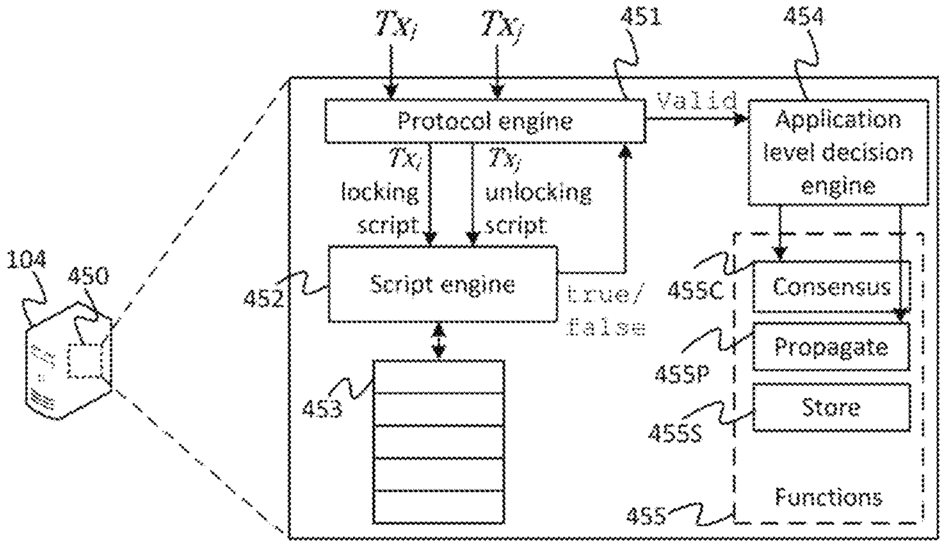
FIG. 4 illustrates example node software for a blockchain node.

FIG. 4 illustrates an example of the node software 450 that is run on each blockchain node 104 of the network 106, in the example of a UTXO- or output-based model. Note that another entity may run node software 450 without being classed as a node 104 on the network 106, i.e. without performing the actions required of a node 104. The node software 450 may contain, but is not limited to, a protocol engine 451, a script engine 452, a stack 453, an application-level decision engine 454, and a set of one or more blockchain-related functional modules 455. Each node 104 may run node software that contains, but is not limited to, all three of: a consensus module 455C (for example, proof-of-work), a propagation module 455P and a storage module 455S (for example, a database). The protocol engine 401 is typically configured to recognize the different fields of a transaction 152 and process them in accordance with the node protocol. When a transaction 152*j* ($Tx_j$) is received having an input pointing to an output (e.g. UTXO) of another, preceding transaction 152*i* ($Tx_{m-1}$), then the protocol engine 451 identifies the unlocking script in $Tx_j$ and passes it to the script engine 452. The protocol engine 451 also identifies and retrieves $Tx_i$ based on the pointer in the input of $Tx_j$. $Tx_i$ may be published on the blockchain 150, in which case the protocol engine may retrieve $Tx_i$ from a copy of a block 151 of the blockchain 150 stored at the node 104. Alternatively, $Tx_i$ may yet to have been published on the blockchain 150. In that case, the protocol engine 451 may retrieve $Tx_i$ from the ordered set 154 of unpublished transactions maintained by the node 104. Either way, the script engine 451 identifies the locking script in the referenced output of $Tx_i$ and passes this to the script engine 452.

The script engine 452 thus has the locking script of $Tx_i$ and the unlocking script from the corresponding input of $Tx_j$. For example, transactions labelled $Tx_0$ and $Tx_1$ are illustrated in FIG. 2, but the same could apply for any pair of transactions. The script engine 452 runs the two scripts together as discussed previously, which will include placing data onto and retrieving data from the stack 453 in accordance with the stack-based scripting language being used (e.g. Script).

By running the scripts together, the script engine 452 determines whether or not the unlocking script meets the one or more criteria defined in the locking script—i.e. does it "unlock" the output in which the locking script is included? The script engine 452 returns a result of this determination to the protocol engine 451. If the script engine 452 determines that the unlocking script does meet the one or more criteria specified in the corresponding locking script, then it returns the result "true". Otherwise it returns the result "false".

In an output-based model, the result "true" from the script engine 452 is one of the conditions for validity of the transaction. Typically there are also one or more further, protocol-level conditions evaluated by the protocol engine 451 that must be met as well; such as that the total amount of digital asset specified in the output(s) of $Tx_j$ does not exceed the total amount pointed to by its inputs, and that the pointed-to output of $Tx_i$ has not already been spent by another valid transaction. The protocol engine 451 evaluates the result from the script engine 452 together with the one or more protocol-level conditions, and only if they are all true does it validate the transaction $Tx_j$. The protocol engine 451 outputs an indication of whether the transaction is valid to the application-level decision engine 454. Only on condition that $Tx_j$ is indeed validated, the decision engine 454 may select to control both of the consensus module 455C and the propagation module 455P to perform their respective blockchain-related function in respect of $Tx_j$. This may include the consensus module 455C adding $Tx_j$ to the node's respective ordered set of transactions 154 for incorporating in a block 151, and the propagation module 455P forwarding $Tx_j$ to another blockchain node 104 in the network 106. Optionally, in embodiments the application-level decision engine 454 may apply one or more additional conditions before triggering either or both of these functions. For example, the decision engine may only select to publish the transaction on condition that the transaction is both valid and leaves enough of a transaction fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model, a result of "true" could be indicated by a combination of an implicit, protocol-level validation of a signature and an additional affirmative output of a smart contract (the overall result being deemed to signal true if both individual outcomes are true).

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In some embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In some other embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "node", "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

Freezing Digital Assets

One of the reasons for interest in public blockchain networks for digital assets is that they can be used for permissionless trustless transactions. By eliminating the need for a central authority or trusted entity to facilitate transfers, blockchain networks enable a holder of a digital asset direct control over the digital asset and movement of the digital asset to another wallet. However, this also creates a challenge to the existing regulatory or legal framework. Without a mechanism to seize, control, or otherwise force transfer of assets, it can be difficult or impossible to apply court orders to digital assets, even when trying to address clear demonstrable fraud or theft.

The growth in interest and investment in cryptocurrencies and other blockchain-based digital asset systems, such as NFTs, has also prompted a significant level of fraud and malicious behaviour. There are many instances of digital assets being 'stolen' through theft of private keys or through obtaining access to the private keys by subterfuge or deception. In some cases, online exchanges have been compromised or have been discovered to have been fraudulent. Governments, courts, and the financial industry are grappling with how to apply conventional tools of enforcement or justice to blockchain-based digital assets.

Attempts to deal with real-world theft, bankruptcy and fraud that impact blockchain-based digital assets might lead courts or other legal or government entities to issue orders to a blockchain organization, blockchain miners, or individual blockchain code programmers. Those orders might direct the recipient to freeze or block further transactions in identifiable digital assets and/or to take those assets into custody or escrow. Some blockchain software may lack the capacity to implement those actions without a complete forking of the chain so as to roll-back mined blocks, which is hugely disruptive and potentially very costly to users, aside from undermining faith and trust in the reliability of the blockchain.

While it may be possible to implement a system where a "trusted" legal entity simply imposes an action on a blockchain network, such as mandating confiscation of a digital asset, such a system would undermine the principle of consensus and independence upon which distributed ledger technology is based. The present application provides systems and methods for freezing digital assets that avoid compromising the consensus-based principles of blockchain networks, and yet provides mechanisms to take action impacting only identified digital assets without the need for rolling out custom blockchain node software changes for each order. The present methods and systems are further structured to ensure that forking operations are minimized, since they result in wasted mining resources expended on invalid blocks.

Figure 5:
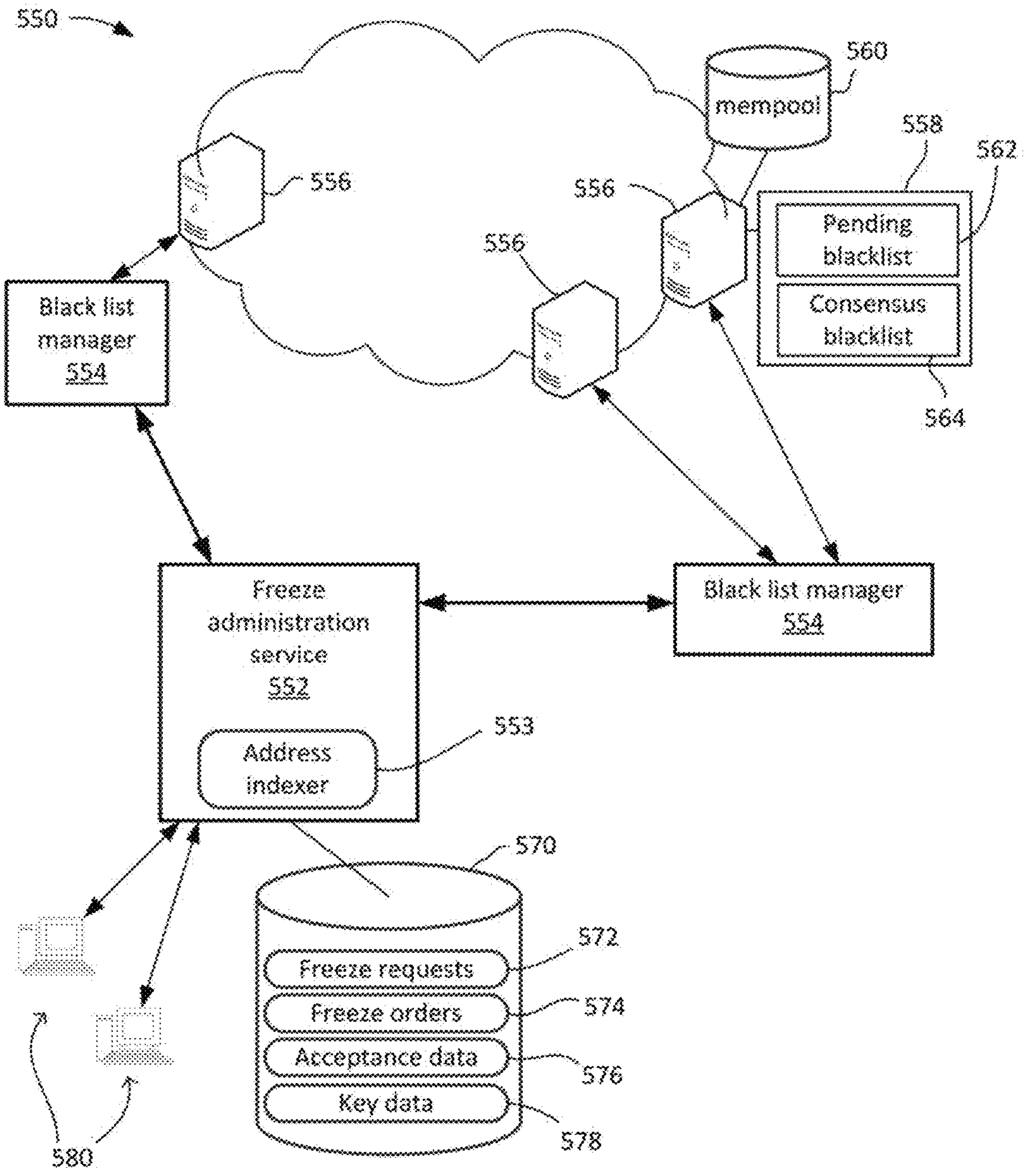
FIG. 5 shows an example system for freezing digital assets.

Reference is first made to FIG. 5, which shows a simplified illustration of an example system 550 for freezing digital assets. The system 550 may include a freeze administration service 552. The freeze administration service 552 may be implemented using one or more computing devices. In some cases, the freeze administration service 552 is a web service. One or more user devices 580 may connected to the freeze administration service 552, for example using a web browser or dedicated application, in order to request or manage freeze events. The user devices 580 provide user credentials that are authenticated by the freeze administration service 552. Different levels of permissions may be allocated to different user types in some implementations.

The freeze administration service 552 is configured to communicate with mining nodes and, in particular, with a blacklist manager 554 implemented at each of the mining nodes. Each blacklist manager 554 is configured to interface with the freeze administration service 552. It may be implemented on a computing device operated by the miner, but is likely on a separate machine from instances of the blockchain mining software, which is usually implemented using dedicated special-purpose computing devices designed for blockchain mining operations. Each miner has one or more blockchain mining node instances 556. Each blockchain mining node instance 556 may have its own mempool 560 containing unconfirmed blockchain transactions. The blockchain mining node instance 556 further includes memory 558 in which it stores two blacklist data structures: a pending blacklist 562 and a consensus blacklist 564. The pending blacklist 562 identifies digital assets that are subject to a freeze request received from the freeze administration service 552, and the consensus blacklist 564 identifies digital assets that are subject to a freeze order accepted by at least a threshold number of mining nodes. The blacklist manager 554 handles communications with the freeze administration service 552 and is responsible for updating the two blacklists 562, 564.

In some cases, each blacklist manager 554 may have more than one associated blockchain mining node instance 556 for which it is managing blacklists, such as where a miner operates more than one blockchain mining node instance 556. As will be described below, given the operation of the consensus blacklisting of digital assets based on miner acceptance, each miner should operate one blacklist manager even if the miner has more than one blockchain mining node.

In general terms, the freeze administration service 552 receives authenticated instructions from one of the user devices 580 to issue a freeze request. The instructions may require certain features, such a court identifier or other credentials to validate the instructions. In some cases, the instructions relate to a court order, and the freeze administration service 552 may, in some implementations, convert a received court order to a machine-readable representation of the court order. In some implementations, one or more digital signature from entities authorized to sign court orders may be verified by the freeze administration service 552. The court order may specify one or more digital assets. The digital asset identifiers may pinpoint particular addresses, e.g. wallet addresses, which are to be frozen as a result of the court order. In some instances, the court order may also or alternatively identify digital assets by way of transaction outpoint; however, in many cases the court order may identify funds by way of their association with a wallet address or other public key representation.

The freeze administration service 552 may include an address indexer 553 configured to convert a wallet address or other public key address to one or more transaction outpoints. It will be appreciated that a single address may be associated with a plurality of digital assets, which (in the case of some blockchains) may be identified by way of the transaction outpoint allocating the asset to that single address. For example, a single public key hash address may be the recipient address for many transactions allocating digital assets, like cryptocurrency or NFTs, to that address. Each outpoint in a transaction that sends digital assets to that address may be identified by the address indexer 553. The address indexer 553 or an associated service may further be configured to engage in children discovery, i.e., tracing operations, to track assets that have been moved from an identified address to one or more other address and the associated outpoints from the transactions that carried out those movements. In some implementations the address indexer 553 is implemented as part of a general blockchain indexer configured to obtain new block data and to index transactions linking spent transaction outpoints to transaction inputs to enable tracing of digital assets through transactions. The blockchain indexer may connect to one or more blockchain nodes to listen for new blocks and to retrieve block data.

The system 550 employs a two-phase or two-stage process for implementing a freeze of digital assets. The freeze administration service 552 may generate a freeze request 572 based on the court order or other instructions. The freeze request 572 specifies the transaction outpoints implicated in the order, for example as may have been identified by the address indexer 553. Freeze requests 572 may be referred to as pending freeze orders or prospective freeze orders. The freeze request 572 may be sent to the blacklist managers 554. In some cases, this may include push transmission of the freeze request 572 or a notification of a new or updated freeze request 572. In some cases, the freeze request 572 is not sent unsolicited, but is made available for download by the blacklist managers 554, if properly authenticated, for example using a REST API. If the miner accepts the freeze request 572, the blacklist manager 554 may generate and return an acceptance message.

The freeze administration service 552 authenticates acceptances messages from blacklist managers 554 relating to the freeze request 572 and stores them in memory, for example a database 570, as a part of acceptance data 576 relating to the freeze request 572. If acceptance messages are received from more than a threshold quantity of miners, then the freeze administration service 552 converts the freeze request 572 into a freeze order 574. The freeze order 574 may then be distributed or made available to the blacklist managers 554, in response to which the blacklist managers 554 implement the freeze order 574, as will be described below.

The freeze administration service 552 further stores key data 578, including its own public key and securely stored private key, and public key data associated with registered or authenticated miners. In some cases, this may include a minerID registered on chain and associated with a specific miner. In some cases, the key data 578 includes coinbase public key data. In some cases, the key data 578 may include delegated key data linked to a minerID or to coinbase public key data.

The blacklist manager 554 receives or obtains the freeze request 572 from the freeze administration service 552. The freeze request 572 is digitally signed by the freeze administration service 552, and the blacklist manager 554 validates that signature to confirm the authenticity of the request. It will be appreciated that there may be many freeze administration services. In some cases, the blacklist manager 554 may have a list of freeze administration services (e.g. a list of their respective public keys or identifiers) that are trusted by the blacklist manager 554 or are deemed by the miner to be legitimate authorities, whether governmental or otherwise.

If the freeze request 572 is authenticated and is determined to be from an accepted freeze administration service 552, then the blacklist manager 554 may generate and send an acceptance message to the freeze administration service 552. The blacklist manager 554 also causes the transaction outpoints in the freeze request 572 to be added to the pending blacklist 562.

If sufficient consensus is reached and the freeze administration service 552 converts the request to the freeze order 574, and if the blacklist manager 554 receives or obtains the freeze order 574, then the blacklist manager 554 adds the transaction outpoints from the pending blacklist 562 to the consensus blacklist 564. In some implementations, even though the transaction outpoints are being added to the consensus blacklist 564, they may not necessarily be removed from the pending blacklist 564. This may have advantages in handling multiple orders implicating the same outpoints, as will be described further below.

The blockchain mining node instance 556 implements the two-phase freeze operation as follows. When a transaction outpoint is on the pending blacklist 562, the blockchain mining node instance 556 removes any transaction that has that transaction outpoint as in input, e.g. UTXO, from its mempool 560. Any new transaction received over the blockchain network from another node (or from other channels, such as a Merchant API or another source) that uses the transaction outpoint as an input is rejected as invalid and will not be included in the mempool 560. In other words, the mining node refuses to mine on any transactions involving the transaction outpoint and refuses to propagate transactions that involve the transaction outpoint. However, during this "pending" phase, the mining node will still accept a solved block from another mining node as valid even if it includes a transaction spending the transaction outpoint. That is, while the mining node itself may treat that outpoint as frozen, sufficient consensus has not yet been reached among miners to treat otherwise legitimate blocks as invalid on the basis that other miner did not treat the outpoint as frozen. Therefore, the blockchain mining node instance 556 will validate a block from another miner that includes the transaction outpoint despite the fact it is on the pending blacklist 562.

Once the transaction outpoint is copied from the pending blacklist 562 to the consensus blacklist 564 in response to receipt and validation of a freeze order, then the blockchain mining node instance 556 will also reject any blocks received from another miner that include the transaction outpoint.

Digital assets frozen by way of this process may also be unfrozen following a similar process. To unfreeze a digital asset, the freeze administration service 552 may prepare and sign an unfreeze request that references the earlier freeze order relating to the digital asset. If a threshold number of mining nodes accept the unfreeze request, then the freeze administration service 552 issues an unfreeze order. As a result of the unfreeze order, the blacklist manager 554 causes removal of the transaction outpoint associated with the digital asset from the blacklists.

Figure 6:
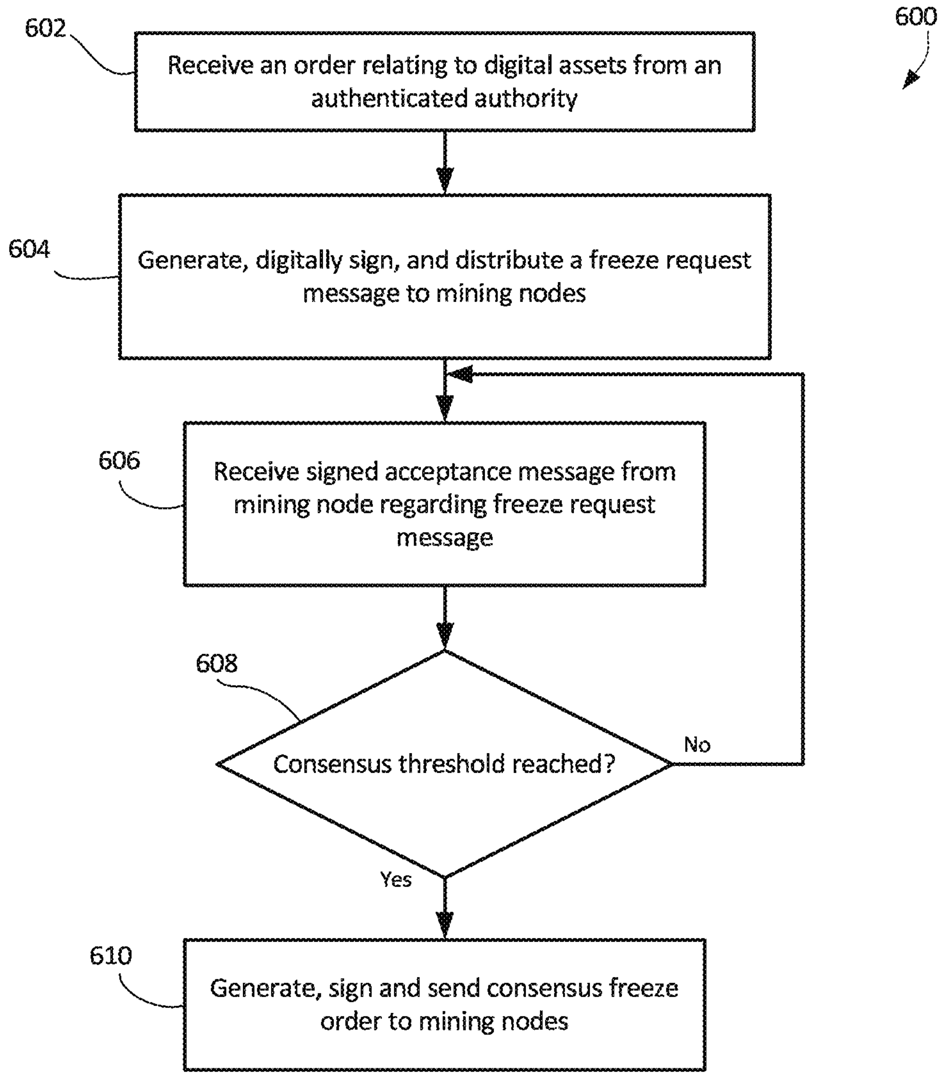
FIG. 6 shows, in flowchart form, one simplified example method of freezing digital assets.

Reference will now be made to FIG. 6, which shows, in flowchart form, one simplified example method 600 of freezing digital assets in a blockchain network. The example method 600 may be implemented using a network-connected computing device. In some cases the computing device may be a server or group of servers operating an online service, such as the freeze administration service 552 (FIG. 5). The operations of the method 600 may be carried out by the computing device based on processor-executed software instructions stored in memory on the computing device. The computing device may be connected to one or more networks, such as the Internet. The computing device may or may not be directly connected to the blockchain network as a node of the blockchain network. In many implementations, the computing device does not operate blockchain protocol software and does not form part of the blockchain network, but is configured to obtain data from one or more blockchain nodes and to send and receive data with one or more mining nodes on the blockchain network.

In operation 602, the computing device receives an order relating to one or more digital assets. This order may be received from a user device over a secure communications channel. Various user accounts may be provided for with the computing device, each user account having a level of access and authentication credentials. The granting of a user account may be based on a subscription or vetting process in which the user is determined to be an authorized representative of a government or legal authority or some other authority that purports to issue orders relating to digital assets. The government or legal authority may have one or more identifiers, e.g. public-private keys, stored at the computing device for digitally signing messages purporting to be on behalf of the government or legal authority. Access permissions to provide signing authority using an authority's private key may be assigned to one or more user accounts associated with that authority.

The order received may, in some examples, be a court order. In some instances, the court order may be in analog form and may be digitized by the computing system, using optical character recognition (OCR) or other techniques. In some cases, the court order may be in digital form, but may be converted to a standardized machine-readable format. The original received court order may be saved in the computing system. A hash of the original court order and/or a hash of the machine-readable court order may be generated and saved as well.

The order identifies one or more digital assets to be frozen. The digital assets may be identified in the order using one or more wallet addresses or other identifiers. If needed, the computing system may determine, based on blockchain indexing, one or more transaction outpoints that reflect the digital assets allocated or associated with the one or more wallet addresses or other identifiers. In some cases, the order may indicate that the order applies only to the identified wallet addresses or outpoints at a certain point in time, or that it applies to funds moved from those addresses subsequent to a time associated with the order. As will be described below, in some cases the computing system may engage in tracing of digital assets through linking of transaction outpoints to identify "child" transaction outpoints on the blockchain to which assets have been moved from the one or more wallet addresses or other identifiers.

In operation 604, the computing system generates and digitally signs a freeze request message. The freeze request message may identify the order, such through inclusion of a hash or inclusion of a full copy of the order. The order may be encoded using a suitable encoding scheme, such as base64 or the like. The freeze request message includes the transaction outpoints to which the request relates and identifies the authority that issued the order, such as by its public key, digital certificate, or another identifier. The freeze request message is digitally signed by the authority that issued the order. That is, the user device that provided the order to the computing device has sufficient credentials to enable digital signature of the freeze request message by the computing device using a private key corresponding to a public key associated with the authority. In this manner, recipients of the freeze request message may verify that the message is authentic and originates from an order by the authority. In some cases, the freeze request message may further be digitally signed by the freeze administration service; however, in some other cases any mining device accessing the freeze request message has separately validated that it is legitimately distributed by the freeze administration service.

The signed freeze request order is distributed to mining nodes that form part of the blockchain network. The distribution may, in some cases, be based on active push transmission of the signed freeze request order to a set of mining nodes known to the freeze administration service. In some cases, the distribution may be based on mining nodes querying the freeze administration service for new freeze messages and, once authenticated by the freeze administration service, being provided with access to the new freeze messages. In some cases, a notification of newly-available freeze messages or orders may be sent to mining nodes, which may then log into and download those messages or orders from the freeze administration service.

In operation 606, having distributed the freeze request message, the freeze administration service awaits receipt of acceptance messages from those mining nodes. An acceptance message identifies the freeze request to which it relates, is digitally signed by the mining node, and provides at least one identifier of the mining node. The freeze administration service tracks the receipt of acceptances and, in operation 608, it determines whether it has received sufficient acceptances that a consensus threshold is reached. The consensus threshold may be set by the user that uploaded the order. The consensus threshold may be subject to a minimum threshold, which may be set at 50% or higher. In some cases, the consensus may further be based on administrator input; that is, once a threshold quantity of miners have accepted the freeze request in some implementations that results in a notification to an administrator of the freeze administration service or to the user that provided the order, but further authorization from the administrator or user is received before triggering the consensus described below.

The consensus threshold may be based on a count of miners, i.e. a percentage of mining nodes, in some implementations; however, this may open the system to abuse if dummy mining nodes may be added to the network. To better track with block mining consensus, the consensus threshold may be based on hash power. That is, only acceptances from miners that have mined a block within a window of time may be counted for the purpose of assessing consensus. In one example, the threshold is based on acceptances from mining nodes that represent a minimum percentage of blocks mined over a recent window, such as the past 288 blocks. The percentage and the window length (number of past blocks) may be configurable in generating the freeze request.

Once a consensus threshold is reached in terms of mining node acceptance of the freeze request, then in operation 610 the computing device generates and sends a freeze order to the mining nodes. The freeze order references the freeze request and, in some cases, provides details and/or copies of the acceptances received in case the mining nodes are configured to independently verify the consensus threshold was reached. The freeze order may identify the transaction outpoints to which the freeze order applies, or may provide an identifier to link it to the freeze request message in which the outpoints are specified. The identifier may be a hash of the freeze request message, a hash of the court order, or other such identifier. The freeze order may also indicate the block height at which the freeze order is to go into effect. That is, the freeze order may not be configured to be implemented immediately upon generation by the computing device or receipt by the mining nodes, since those times may vary and may resulting in forking and orphaned blocks. Therefore, the computing device may set a future block height at which the freeze order becomes effective. The freeze order is transmitted, made available, or otherwise distributed to the mining nodes.

Figure 7:
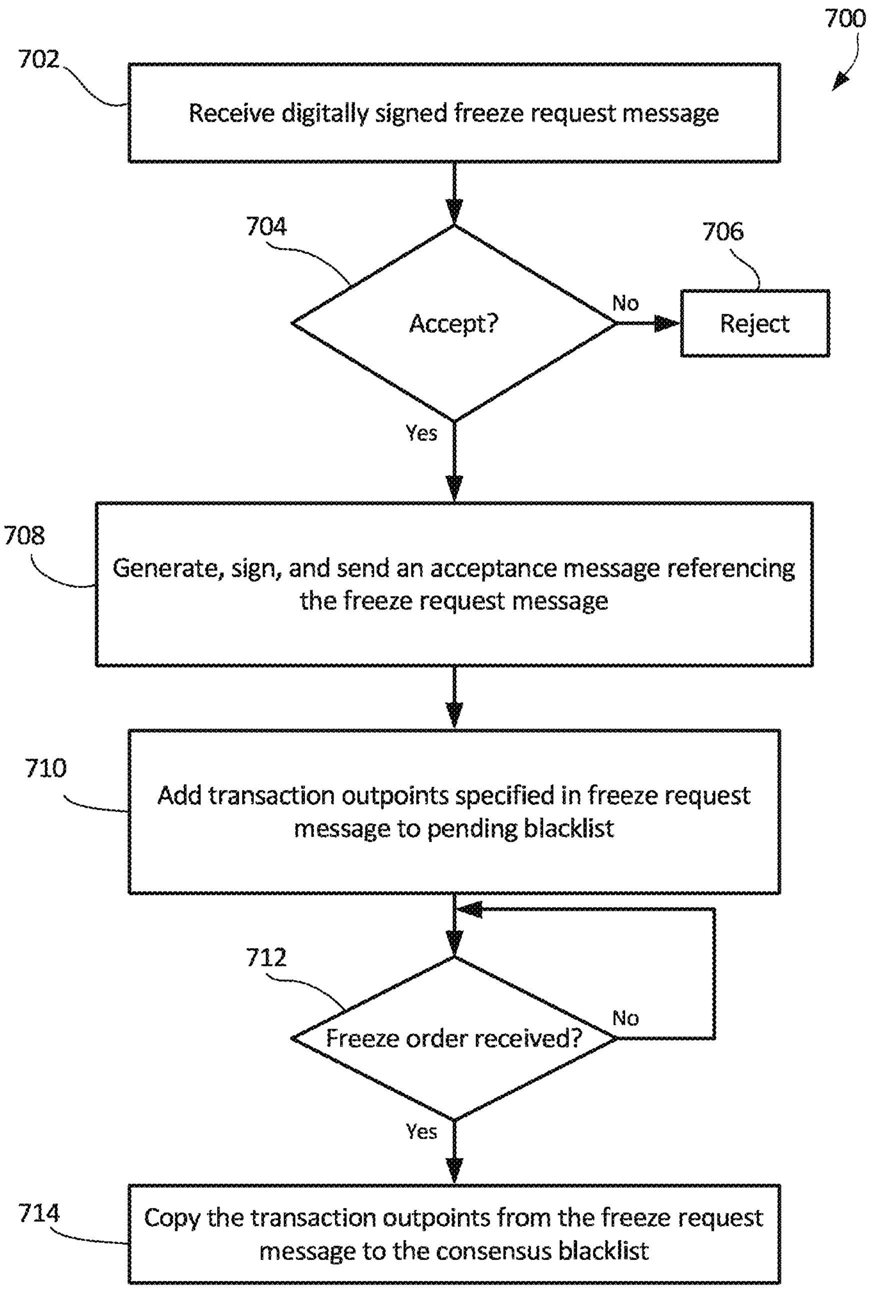
FIG. 7 shows, in flowchart form, one simplified example method for implementing a freeze at a mining node.

FIG. 7 shows, in flowchart form, one simplified example method 700 of implementing a freeze of digital assets on a blockchain network. The method 700 may be implemented using a network-connected computing device and, in particular a mining node that is part of the blockchain network. In some cases the mining node may be a server or group of servers operating blacklist manager 554 (FIG. 5). The operations of the method 700 may be carried out by the mining node based on processor-executed software instructions stored in memory on the computing device.

In operation 702, the mining node receives or obtains the freeze request message from the freeze administration service. In some implementations, the mining node is configured to periodically query the freeze administration service for new freeze request messages. In some cases, the mining node receives a notification that a new freeze request message is available from the service. In some cases, the service transmits a copy of the freeze request message to the mining node.

In operation 704, the mining node determines whether to accept the freeze request message. The determination of whether to accept the request may be based, in part, on validating the message by confirming it originates from a freeze administration service the mining node recognizes. This may be determined based on authentication data exchanged during communications with the service and/or through verifying a digital signature on the freeze request message. The mining node may also or alternatively verify that the freeze request message is based on an order from an authority that it recognizes as legitimate. This verification may be based on verifying a digital signature on the freeze request message from the authority. For example, a mining node may have a register or other data structure storing public keys or other identification data for authorities that its recognizes as legitimate. Examples may include certain government departments form one or more countries or sub-national governments, or certain courts or other administrative tribunals. A miner may configures its mining nodes to recognize such authorities as the miner independent determines as legitimate. The mining node may further verify that the freeze request message meets certain prescribed requirements of format and content.

If the mining node determines that the freeze request message is legitimate and is from a recognized authority, then it may accept it; otherwise, it rejects the message as indicated by operation 706. To accept the freeze request message, the mining node, and in particular the blacklist manager, generates and sends an acceptance message to the freeze administration service as indicated by operation 708. The acceptance message references the freeze request message and is digitally signed by the mining node using a key pair associated with the mining node. The acceptance message may include identifying addresses or public keys associated with the mining node to enable the freeze administration service to properly identify blocks mined by the miner and, thus, its hash power or voting power in the consensus determination.

If the mining node accepts the freeze request message, then in operation 710 it adds the transaction outpoints specified in the freeze request message to its pending blacklist. If a transaction is subsequently received over the blockchain network that purports to use one of the transaction outpoints as an input, then the mining node will consider that transaction to be invalid, will not add it to the mempool, and will not propagate that transaction further on the blockchain network. The mining node also removes any pending transactions already received from its mempool if those transactions include one of the transaction outpoints as an input.

By putting the transaction outpoints on the pending blacklist, the mining node thereafter excludes transactions involving those outpoints from any candidate block being mined by the mining node, and will not propagate any pending transactions involving those outpoints. However, because the freeze is not yet implemented by consensus, the mining node will still accept a mined block as valid if it is received during this time despite the mined block including a transaction that includes as an input one of the transaction outpoints from the pending blacklist. During this time, any such block that is received and validated it added to the blockchain despite the fact it involves transactions that use digital assets that are subject to the prospective freeze.

The mining nodes monitors for implementation of a consensus freeze in operation 712. The consensus freeze may be signalled by the freeze administration service through issuance of a signed freeze order. As noted above, the freeze order may provide details of the acceptances received from various mining nodes. The mining node may verify that consensus was reached, in some implementations, as part of validating the freeze order. The freeze order may be received from the freeze administration service through query and download by the mining node or by receipt of push transmission from the freeze administration service, in some implementations. If the mining node determines that the freeze order is valid, then in operation 714, the mining node copies the transaction outpoints from the pending blacklist to the consensus blacklist. The mining node does not, in these examples, remove the transaction outpoints from the pending blacklist, which may be advantageous when it comes to resolving multiple freeze requests or freeze order conflicts.

Figure 8:
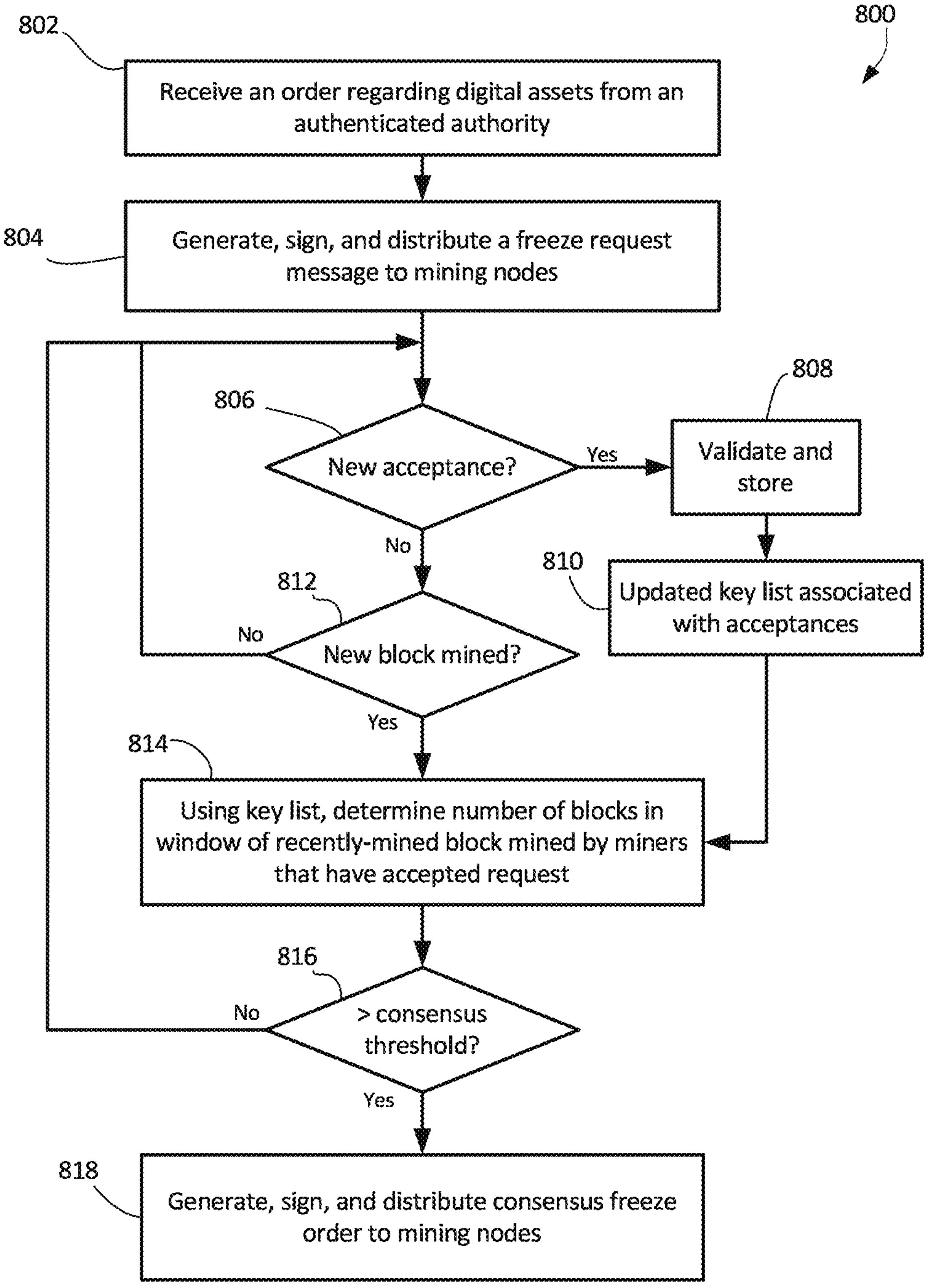
FIG. 8 shows, in flowchart form, another example method of freezing digital assets.

Reference will now be made to FIG. 8, which shows a further example method 800 of freezing digital assets in connection with a blockchain network. The method 800 may be implemented by a computing device configured to provide a freeze administration service. In operation 802, the computing device receives and authenticates an order regarding digital assets. As noted above, the order may originate from an authority and the legitimacy of the order may be verified by the computing device using one or more mechanism. The computing device generates and digitally signs a freeze request message, as indicated by operation 804. The digital signature may be the digital signature of the authority that issued the order. Generation of the freeze request message may include determining the transaction outpoints to which the freeze relates based on the digital assets identified in the order received from the authority. In some cases, the identification of transaction outpoints may include tracing assets from an address, e.g. a pay-to-public-key-hash address, used in one transaction outpoint to other addresses in subsequent transactions using indexed transaction data regarding the blockchain.

Operation 804 further includes distributing the freeze request message to mining nodes and, in particular to a network-connected computing device at a mining node that implements a blacklist manager. Each blacklist manager may serve to manage the blacklists for a single miner, but may manage blacklists at multiple mining node instances, if the miner operates multiple mining node instances.

Once the freeze request message has been distributed to blacklist managers, the computing device awaits receipt of acceptance messages from those blacklist managers on behalf of their respective miners. If a new acceptance message is detected by the computing device, as indicated by operation 806, the computing device validates the message and stores the acceptance data in memory in operation 808. Validation may include verifying that the message is digitally signed by a mining node. In some cases, the mining node may have registered identities on the blockchain, such as a minerID, enabling the computing device to verify that the minerID is in force and legitimate, and that it corresponds to the digital signature applied to the acceptance message. Other mechanisms may also be used to verify that the acceptance message is digitally signed by a recognized mining node of the blockchain network. The acceptance message may include key data relating to the miner. That is, it may include a minerID, a public key or public key hash associated with the miner that enables the computing device to identify blocks mined by the miner based on the minerID, public key or public key hash corresponding to the private key used to sign the acceptance message. In some cases, it may identify such blocks based on the address to which a block reward is allocated in the coinbase transaction within the block. The coinbase transaction may allocate the block reward to a public key hash that corresponds to a public key specified in the acceptance message.

In some instances, the mining node may not want to use its coinbase public key address in connection with this function and may instead wish to use a different key pair for signing the acceptance message, in which case it may link the coinbase key to the signing key pair by way of a key delegation operation, as will be described below. If so, then the acceptance message may include delegated key data enabling the computing device to associate public key hashes in coinbase transactions with a particular miner even though the digital signature used for the acceptance message is not the corresponding private key.

In operation 810, the computing device may update a stored key list associated with the acceptance to ensure that it is able to track key data linking the miner and its acceptance to blocks mined on the blockchain by that miner. The computing device then proceeds to operation 814 to assess whether the new acceptance results in a determination that consensus has been reached.

If no new acceptance is received, in operation 812, the computing device may assess whether a new block has been mined. If so, then it may identify the mining node that mined the new block and may determine the number of blocks, in a recent window of blocks, mined by each mining node. On this basis the computing device can assess what percentage or number of blocks in the window have been mined by mining nodes that accepted the freeze request message, as shown by operation 814.

The window may be a window of time in some cases, or a number of blocks. In some examples, the number of blocks may be about 288, which represents about two days of mining on the bitcoin network, given the average time to mine a block is about 10 minutes. In other blockchain networks, different measures of mining hash power may be used to assess the percentage of hash power that has accepted the freeze request message.

The window may be a window of recent blocks looking back from a current block or current time, so as to represent a measure of recent hash power in the blockchain network. In some cases a longer window spanning multiple days or weeks may be desirable to avoid having a surge of rented or temporary hash power exert outsized control over a freeze consensus.

In some cases, the window only begins with issuance of the freeze request message by the freeze administration service or some other time linked to generation or upload of the order or the generation or distribution of the freeze request message. The window then awaits mining of at least a threshold number of blocks, such as 288 or another specified quantity, and after the threshold number of blocks is reached the computing device then starts to assess whether the consensus threshold percentage acceptance has been reached. The window may expand to include new blocks from that point forward, or may be a moving window that only takes into account the specified quantity of most recent blocks.

As shown in operation 816, if a threshold number or percentage of blocks in the window are associated with miners that accepted the freeze request message, then the computing device generates, signs, and distributes a freeze command message in operation 818. The freeze command message is a freeze order and may specify the transaction outpoints to which it applies, or may reference them by referencing the freeze request message. Mining nodes, in particular blacklist managers, that receive the freeze command message add the frozen transaction outpoints to the consensus blacklists. The freeze comment message may specify an enforcement time, or an enforcement block height. Transaction outpoints on the consensus blacklists that appear in a block after the enforcement time or block height result in invalidate of that block. Accordingly, once sufficient consensus has been reached to issue the freeze command message, even mining nodes that did not accept the freeze request message are likely to implement the freeze or they risk wasting energy mining invalid blocks that will be rejected by the network.

If a consensus has not yet been detected in operation 816, the computing device may return to operation 806 to await further acceptances and/or additional blocks in the window for assessing acceptance hash power.

As noted, the determination of whether consensus has been reached is based on receipt of acceptance messages signed by a miner and confirmation that the miner has recently mined at least one block. In one embodiment, the process of associating a new block with a particular miner may include:

1. Constructing a set of public keys used in a coinbase document:
   (a) if the coinbase transaction contains a single P2PKH output and all other outputs are not payment outputs (e.g. OP_RETURN, OP_FALSE OP_RETURN, etc.) then add the corresponding public key to the set. If there are multiple P2PKH outputs or other non-standard outputs, do not add any keys to the set;
   (b) if the coinbase transaction contains a valid MinerID then add it to the set. Also add all preMinerIDs from the start of the window of blocks being evaluated (e.g. looking back 288 blocks into the chain from the current new block for example), where a "preMinerID" is a previous MinerID linked to a current MinerID in implementations in which a miner may rotate its keys.
2. If an acceptance message public key is contained in the set, then the acceptance message is associated with this block.
3. If the set contains any of the keys listed as a delegating public key in the delegated keys data within an acceptance message, and the public key corresponding to the signed acceptance message is among the listed delegated public keys in the delegated keys data, then the acceptance message is associated with this block.
4. Otherwise, the block is not associated with the acceptance messages.

Note that in step 3, only delegated public keys from a current acceptance message are taken into account, meaning the key delegation is only valid in the scope of this acceptance. If a mining node submits acceptance of two different freeze requests, each of the acceptance messages may contain different sets of keys and presence of a delegated key in one acceptance message relating to that miner does not necessarily transfer to another acceptance message from that miner unless it contains delegated key data specifying that delegated public key.

When calculating a percentage of hash power associated with acceptance messages, in some embodiments, the window looks back a set number of blocks (e.g. 288) from the most-recently mined block. This decouples the acceptance process from mining new blocks. A miner does not need to mine a new block in order for its acceptance to count provided it has mined a block within the window. Acceptances can therefore be collected in a short period of time, and it assumes that past distribution of hash power is a reasonably good indicator of current distribution of hash power.

Figure 9:
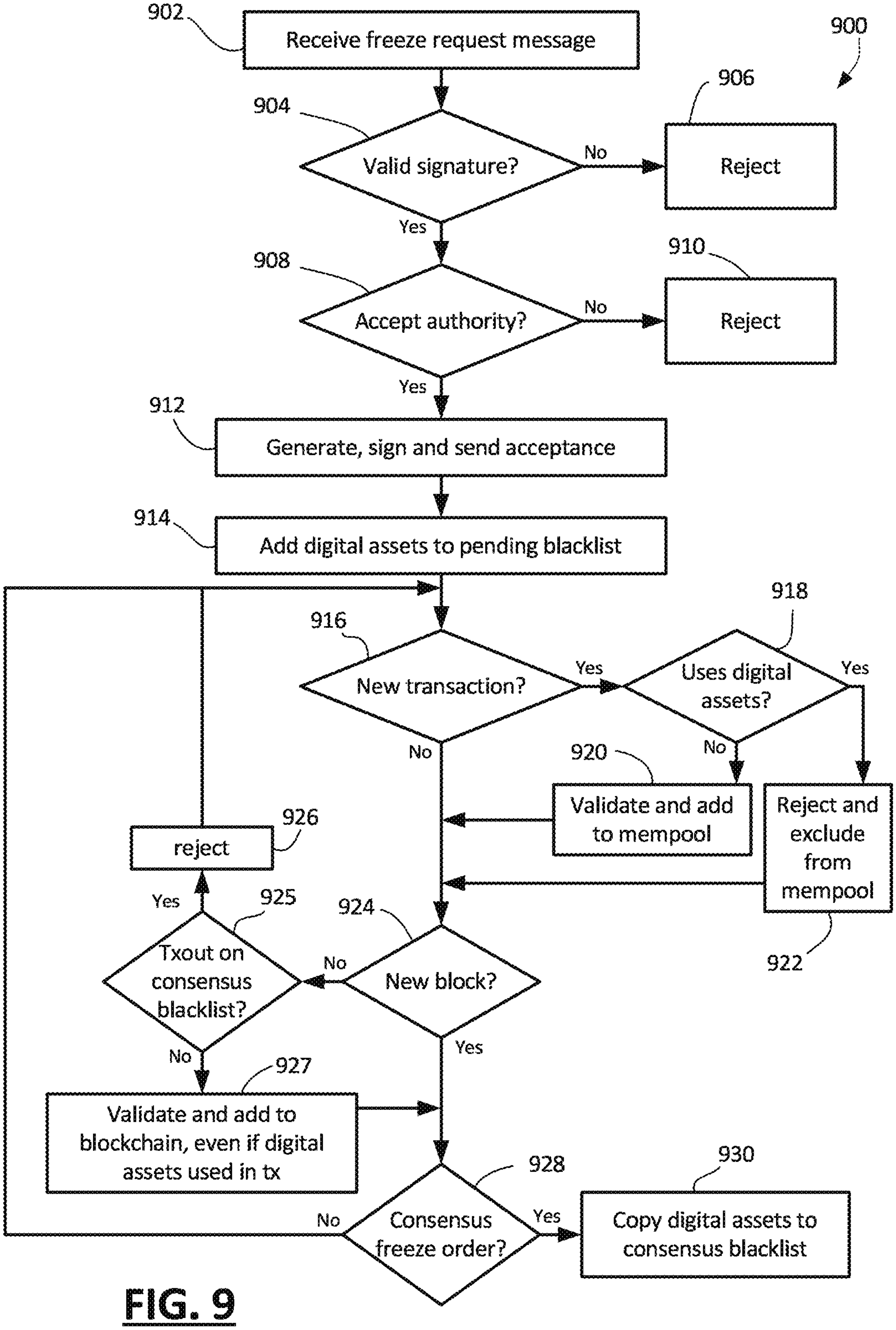
FIG. 9, shows, in flowchart form, another example method for implementing a freeze at a mining node.

FIG. 9 shows a further example method 900 of implementing a freeze of digital assets on a blockchain network. The method 900 may be implemented by a computing device associated with a blockchain miner and, in particular, by a blacklist manager operating on the computing device. The blacklist manager may be implemented by way of software instructions that, when executed by a processor of the computing device, cause the computing device to carry out the described operations. The computing device may manage freeze and unfreeze operations in relation to digital assets for at least one instance of a blockchain mining node.

In operation 902, the blacklist manager obtains or receives a freeze request message from the freeze administration service. The freeze request message identifies the authority that issued the order and the transaction outpoints to which the freeze request applies. It may also provide details regarding the consensus threshold and an encoded copy or representation of the order from the authority. In operation 904, the blacklist manager validates at least one digital signature on the freeze request message. This may be a digital signature associated with the authority, thereby indicating that the request relates to a legitimate order from the authority. The freeze message may also or alternatively include a digital signature from the freeze administration service, which itself may be deemed an authority in some implementations. If the digital signature cannot be verified using the corresponding public key, then the request message is rejected in operation 906. It may reject the request by simply not responding to it in some cases.

In operation 908 the blacklist manager determines whether the freeze request is accepted. This determination may be based on a number of factors set within the blacklist manager and may be configurable by an administrator of the blockchain miner. The determination may be based on whether the authority is recognized as an authority by the blacklist manager. The blacklist manager may have a list or other data structure identifying recognized authorities and, in some cases, their corresponding public key(s). In some cases, the determination may be based partly on the consensus threshold being at least a minimum percentage or number. The determination may also be based on the nature of the digital assets in some implementations, such as whether they relate to cryptocurrency or are tokens, such as non-fungible tokens (NFT), or the particular type of NFT involved. If the blacklist manager determines that the freeze request does not meet its set criteria for acceptance, then it rejects the request 910. It may reject the request by simply not responding to it in some cases.

If the request is accepted, then the blacklist manager generates and digitally signs an acceptance message and transmits the acceptance message to the freeze administration service, as indicated by operation 912. The acceptance message references the freeze request message and includes a digital signature of the mining node. The digital signature may use a minerID key pair, or other set of keys associated with the mining node. The key used corresponds to an address or identifier used or referenced in blocks mined by the mining node, such as an address to which coinbase transactions are payable, or is linked to such an identifier or address by way of delegated key data. The delegated key data may be published separately or may be included in the acceptance message, so as to ensure the freeze administration service is able to link blocks mined by the mining node to the digital signature used in signing the acceptance message.

If the request is accepted, then in operation 914 blacklist manager also adds all the transaction outpoints identified in the freeze request message to the pending blacklists maintained at any mining node instances that it is associated with. It may do so using, for example, a remote procedure call (RPC) function defined for editing or amending a blacklist stored in memory at a blockchain mining node instance. In some cases, the mining node instances are also configured to search existing pending transactions in their mempools to determine if they involve any of the newly-blacklisted transaction outpoints as inputs and, if so, to then remove them from the mempool and from any candidate block being mined by the mining node instance.

Once the transaction outpoints have been added to the pending blacklist(s), the blacklist manager awaits issuance of a consensus-based freeze order from the freeze administration service, or an "unfreeze" request that effectively cancels the previously-accepted freeze request. In meantime, the mining node instances continue to engage in mining operations, searching for proof-of-work solutions to candidate blocks and validating newly-received transactions and solved blocks from other mining nodes. As indicated by operation 916, if a new transaction is received by the mining node over the blockchain network, then in operation 918 the mining node instance determines whether the new transaction involves a transaction outpoint on its pending or consensus blacklists. The mining node instance may use any suitable comparison or matching process for assessing whether transaction inputs on the new transaction correspond to transaction outpoints on the blacklists. If not, then the mining node instance validates the new transaction as usual in accordance with the governing blockchain protocol and adds it to the mempool of unconfirmed transactions, as indicated by operation 920. The mining node instance further propagates the new transaction on the blockchain network in accordance with the blockchain protocol. However, if the new transaction involves a transaction outpoint on either the pending blacklist or the consensus blacklist, then in operation 922 the mining node rejects the new transaction and excludes it from the mempool. It does not propagate the rejected transaction on the blockchain network.

In some instances, as shown by operation 924, while awaiting a consensus freeze order, the mining node may receive a newly-mined block, or message regarding a newly-mined block, from another mining node. In operation 925, the mining node may assess whether the block contains any transactions that reference transaction outpoints that appear on the consensus blacklist and, if so, it rejects the block 926. Note that it does not reject the block if the transaction outpoints are only on the pending blacklist since the overall blockchain network has not concluded that those outpoints are subject to a consensus freeze. If the transactions do not involve any outpoints that are on the consensus blacklist, then in operation 927 the block is validated and added to the blockchain in accordance with the usual blockchain protocol. This may include adding a block that features transactions that have as inputs one or more transaction outpoints appearing on the pending blacklist. Nevertheless, the new block will be considered valid. Even if the transaction outpoints are later added to the consensus blacklist due to a consensus threshold being reached the newly-mined block will not retroactively be invalidated.

In operation 928 the blacklist manager assesses whether a consensus freeze order relating to the freeze request message has been received. If so, then it causes the mining nodes to copy the transaction outpoints identified in the freeze request message from the pending blacklist to the consensus blacklist. In many cases, the consensus freeze order specifies a block height at which the freeze takes place, in which case the blacklist manager awaits realization of that block height before adding the transaction outpoints to the consensus blacklist. Once the transaction outpoints are on the consensus blacklist, any subsequent new transactions or newly-mined blocks that involve those transaction outpoints will be rejected as invalid. Any previously mined-blocks that were added to the blockchain before the consensus freeze order went into effect, and that involved the transaction outpoints as inputs, are not invalidated.

The above-described methods relate to freeze operations with regard to specified digital assets. Similar methods may be used in carrying out unfreeze operations. An unfreeze operation may be considered a cancelling or revocation of a freeze request or freeze order. In some implementations, in order to give effect to an unfreeze request, the unfreeze request message is digitally signed by the same authority as the freeze request message. That is, in some examples, the freeze request or freeze order cannot be retracted or revoked by a different authority. In some cases, the unfreeze request may be signed by a different key than the freeze request provided that the keys are related.

In one variation, in some implementations, a higher authority may be able to implement and unfreeze operation where the original freeze operation originated with a lower authority. As an example, a court may issue an order to freeze certain digital assets, but a higher court may allow an appeal of that order and direct that the freeze order be revoked or cancelled. In some cases, the blacklist list managers may have stored thereon a designated hierarchy of related authorities so that it is known which authorities can override which other authorities. In some cases, no authority can override another so the appeal court must cause the lower court to digitally sign an unfreeze request message in order to give effect to the appeal judgment.

If a freeze request message has been distributed and consensus has not yet been reached, then a corresponding unfreeze request message received by and accepted by the blacklist manager will result in the blacklist manager causing removal of the affected transaction outpoints from the pending blacklist, assuming they are not also implicated by another different freeze request message. The interaction of different requests and orders from different authorities that involve the same digital assets is discussed further below.

If a consensus has been reached and a freeze order has resulted, then an unfreeze request message is treated like a freeze request message in that consensus must be reached before action is taken. However, with the unfreeze request message, no immediate change to blacklists occurs; the mining node continues to maintain the transaction outpoints on both blacklists until a consensus threshold is reach with regard to the unfreeze request message and an unfreeze order is distributed. At that point, the blacklist manager causes removal of the transaction outpoints from both blacklists making them thereafter available for valid transactions.

As mentioned above, in some cases an order from an authority may specify one or more particular digital assets by way of address, e.g. wallet addresses, pay-to-public-key-hash (P2PKH) addresses, pay-to-script-hash (P2SH)

addresses, or other forms of address. In some cases, the order may specify transaction outpoints rather in addition to or instead of addresses. An address indexer at the freeze administration service, or to which the service has access, is configured to resolve transaction outpoints from addresses, i.e. to identify transaction outpoints sending digital assets to a particular address. It may further be configured to trace the children of a transaction outpoint (TXOUT), i.e. to find a transaction outpoint used as an input to a later transaction and to identify the outputs of that later transaction as linked to the TXOUT as children outpoints. The indexer may be standalone or separate component accessible through a REST API or similar interface. It may connect to a blockchain node instance to listen for new blocks and retrieve block data. The address indexer uses data from the blocks on the current chain as well as unconfirmed transactions in a mempool. In some other implementations, the address indexing operations may be implemented at the mining node level, meaning that the freeze administration service may issue freeze request messages identifying addresses and the blacklist managers/mining nodes may carry out the function of tracing specific outpoints that map to those addresses.

In some cases, the address indexer may be configured to receive an address and a time and will provide in reply a set of TXOUTs, each of which can be specified as a pair formed from transaction identifier (TXID) and output index (vout). The set will reference TXOUTs created in blocks with time no earlier than the time specified.

In some cases, the address indexer may be configured to provide child data with regard to TXOUTs. In this regard, it may provide a function or API in which it receives a TXOUT and provides an array or other data structure specifying the TXOUT, and a set of child TXOUTs. It may further provide information regarding the blocks in which the TXOUT was used to generate the child TXOUTs. An array may be provided since a single TXOUT may be spent multiple times in presence of forks.

When an order specifies that child outpoints are to be frozen in addition to any specific transaction outpoints, the address indexer may be used to trace digital assets passing to new transaction outpoints when generating the freeze request order. In one example implementation, this may be carried out by:

a) Scanning all blocks from TXOUT creation time up to the latest time. This can be quite time consuming. Scanning the whole blockchain could require several hours and a lot of resources;
b) Using off-the-shelf graph database or custom implementation and updating relations as soon as new block arrives (requires more storage upfront);
c) Using series of calls to existing address/output indexer (such as ElectrumX server) and fully indexed blockchain node to perform recursive lookup for each frozen asset. Because of address reuse this may end up being slow; or
d) Building a custom indexer component that would index addresses and how outputs are spent (and new outputs are created).

Whether an order specifies an address or specific transaction outpoints, the freeze administration service starts by identifying the affected transaction outpoints. It may then trace any transactions that use those transaction outpoints, i.e. children outpoints, and the children outpoints are added to the list of transaction outpoints. Note that the new address to which the children outpoints allocate assets is not added, since this may implicate other unrelated assets held by that address.

The responsibility for identifying children transaction outpoints rests with the freeze administration service in these examples. This has the advantage that mining nodes may therefore run non-indexed or pruned nodes, they do not need address indexers or child discovery tracing capability, and the list of outpoints in the freeze request message digitally signed by the authority is static and common to all miners, thereby avoiding risk of inconsistent freezes and chain forking. The downside is that subsequent movement of assets from the identified outpoints during the time from generation of the freeze request message and distribution of it to miners and miner acceptance of the request, will result in evading the freeze. If additional child outpoints are to be included in a freeze request after the signed freeze request message has been distributed, the freeze administration service and authority may generate and send a second or subsequent freeze request message.

As mentioned above, a TXOUT may be affected by more than one freeze request and/or freeze order from the same authority or from different authorities. The blacklist managers may be responsible for consolidating statuses and ensuring the blockchain node instances have a unified view. In this regard, the blacklist manager may consider an outpoint to be pending frozen, i.e. belongs on the pending blacklist, if it appears in at least one freeze request message and there is no consensus freeze order listing that outpoint yet. Similarly, the outpoint is considered frozen, i.e. belongs on the consensus blacklist, if it is subject to at least one consensus freeze order and that freeze order has not been revoked/cancelled due to a consensus unfreeze order that references the freeze order. In some implementations, if there are two consensus freeze orders from different authorities that affect a transaction outpoint and a later consensus unfreeze order is distributed that references that transaction outpoint, then the blacklist manager will unfreeze the transaction outpoint irrespective of the fact that more than one freeze order applied to it. In many other implementations, however, an unfreeze order is only effective to unfreeze an outpoint with respect to a specific related freeze order. That is, if the outpoint is subject to two consensus freeze orders, a consensus unfreeze order that references one of those freeze orders will not be sufficient to remove the outpoint from the consensus blacklist until a consensus unfreeze order referencing the other freeze order is also distributed.

Figure 10:
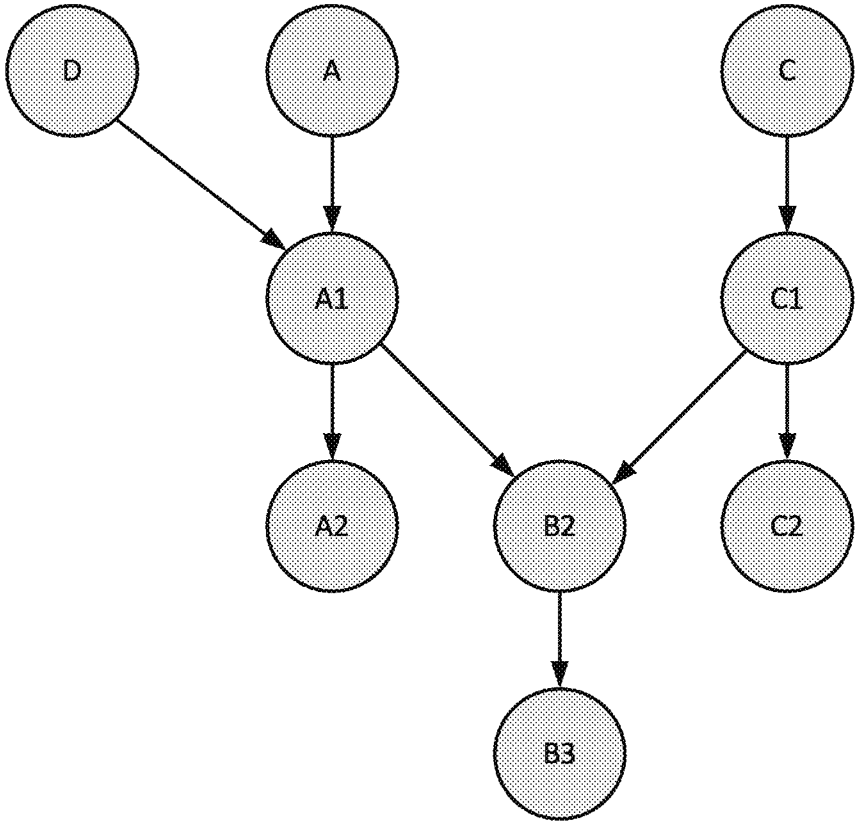
FIG. 10 diagrammatically illustrates overlapping freeze orders and multiple transaction outpoints.

As an example, FIG. 10 diagrammatically illustrates a set of interrelated transactions. The transactions include transactions A and D, which each have at least one outpoint that is used in transaction A1, which has at least one outpoint used in transaction A2 and one in transaction B2. Transaction C has at least one outpoint used in transaction C1, which has at least one transaction outpoint used in transaction B2 and at least one used in transaction C2. Transaction B3 takes at least one transaction outpoint from B2 as an input. Each of the transactions may have at least one unspent transaction outpoint in some implementations.

A first court order may identify digital assets associated with transaction A and related transactions A1, A2, B2, and B3. A freeze request may be generated identifying transaction outpoints in those transactions (A, A1, A2, B2, and B3). A second court order may identify digital assets associated with transaction C and related transactions C1, C2, B2, and B3. A third court order may identify transaction D and related transactions A1 and A2. These court orders may be received by and/or processed by one or more freeze administration services at differing times. Moreover, it is possible that corresponding unfreeze orders may later be generated with respect to any one or all of the court orders, which may result in conflicting orders impacting the same outpoints. To illustration, the following chart maps the handling of freeze requests, freeze orders, and unfreeze orders with regard to these three example court orders:

| # | Event | Call from Blacklist Manager to Mining Node Instance | Remarks |
|---|---|---|---|
| 1 | Freeze request 1 arrives, requiring freeze of outpoints of A, A1, A2, B2, B3 | addToPendingBlacklist({A, A1, A2, B2, B3}) | |
| 2 | Freeze request 2 arrives, requiring freeze of outpoints of C, C1, C2, B2, B3 | addToPendingBlacklist({C1, C2}) | Even though B2 and B3 are associated with two requests they need only be added to the pending blacklist once |
| 3 | An unfreeze request 1 for all assets from freeze request 1 arrives. Unfreeze request 1 does not need to reach consensus since freeze request 1 had not yet reached consensus | removeFromPendingBlacklist(A, A1, A2) is called | B2 and B3 are still referenced by freeze request 2, so are left on the pending blacklist |
| 4 | Freeze request 3 arrives, requiring freeze of D, A1, A2, B1, and B2 | addToPendingBlacklist({D, A1, A2}) | A1 and A2 are added back to pending blacklist, B2 and B3 are already on pending blacklist so they are not added again |
| 5 | Miners reach consensus to start enforcing consensus freeze for freeze request 2. Freeze order arrives re C, C1, C2, B2, B3 | addToConsensusBlacklist({C, C1, C2, B2, B3}) | |
| 6 | Unfreeze request 2 arrives, referencing freeze request/order 2. It proposes unfreezing of C2 and B3, while not unfreezing C, C1, and B2 | | Because request has achieved consensus and is now a freeze order, need to await consensus to act on unfreeze request |
| 7 | Miners reach consensus and unfreeze order arrives, referencing freeze request/order 2 and directing unfreeze of C2 and B3 | removeFromConsensusBlacklist(C2, keepOnPending = false) removeFromConsensusBlacklist(B3, keepOnPending = true) | C2 is removed from consensus and from pending blacklist B3 is removed from consensus blacklist, but is still kept on pending blacklist, because it is referenced by freeze request 3 |
| 8 | Unfreeze order for all funds from freeze request 3 arrives. | removeFromPolicyBlackList({B3, A0, A1, A2}) | B3 is now removed from pending blacklist since it is no longer referenced by request 3. A0, A1 and A2 are also removed from pending blacklist. B2 remains frozen since it is still subject to freeze order 2. |

In some cases, different freeze or unfreeze orders referencing the same digital asset may specify different block heights at which the orders take effect. In that case, the following rules may be applied in some implementations:

1. If the same outpoint is referenced by multiple consensus freeze orders with different enforceAtHeight values, the minimum value is used for adding the outpoint to the consensus blacklist.
2. If the same outpoint is referenced by multiple consensus unfreeze orders with different enforceAtHeight values and those unfreeze orders reference the same freeze order, a minimum value is used, meaning the outpoint is removed from the consensus blacklist and the pending blacklist based on the earliest enforceAtHeight reached.
3. If the same outpoint is referenced by multiple consensus unfreeze orders with different enforceAtHeight values and those unfreeze orders reference the different freeze order, then the outpoint may be removed from the consensus and pending blacklists when the last of the consensus unfreeze orders goes into effect, provided there are no other active consensus freeze orders affecting that outpoint.

In the above examples, once a consensus threshold is reached the freeze administration service generates and distributes a freeze order (consensus activation document). In response, the mining nodes add the specified transaction outpoints to the consensus blacklist and, thereafter, will not validate or propagate blocks that include a transaction spending any of those specified transaction outpoints. This may be referred to as a "hard consensus freeze". In some implementations, however, the mining nodes may be configured to implement a "soft consensus freeze".

In a "soft consensus freeze", the mining nodes still maintain the consensus blacklist identifying frozen transaction outpoints. If a block is received that contains a transaction spending one of the frozen transaction outpoints the mining node still treats the block as invalid. The block is considered "frozen" by the mining node. The soft consensus freeze is implemented with a block count of N, which may be specified in the freeze order or predetermined and set by protocol. In operation, the mining node treats the "invalid" block as frozen and will consider it invalid unless more than N blocks are added to that "invalid" block. In other words, despite the fact the outpoints are consensus frozen, not every mining node may treat them as frozen. Some mining nodes may continue to mine as though the transactions spending those outpoints are valid and, if those mining nodes are sufficiently successful, may succeed in building a chain of more than N blocks atop the "invalid" block. In that case, the mining nodes that otherwise considered that block "invalid" would then reverse that decision and now treat the block as valid and treat that chain as a best tip candidate.

As described in the above illustrative embodiments, various document or message types may be exchanged between the freeze administration service and the blacklist manager, or between the blacklist manager and the mining node instances. Various of the documents are digitally signed by an authority, the freeze administration service, the mining node, etc. Enveloped signature may be used when the original document is stored as a string in payload fields as described by JSON Envelope spec BFRC 6a7a2dec8b17, for instance.

Illustrative example document structures are provided below, although it will be understood that variations may be made in some implementations. Any specific implementation may prescribed a document structure to enable interoperability and standardize communications. In the examples below, not all fields may be required fields for a valid document.

Freeze Request Message

| | |
|---|---|
| { | |
| "documentType" : "freezeequest" | Identifies the type of document, which in this case is a freeze request message |
| "courtOrderId" : <Alphanumeric> | Authority assigned court (or other authority) order identifier. Might not be unique. |
| "validFrom" : <UTC timestamp> | Optional. Not used by Blacklist manager since pending enforcement starts immediately and consensus enforcements starts when consensus is reached between miners. |
| "freezeChildren": <boolean> | Required. When true, all outputs of a transaction that tries to spend frozen funds are frozen too. |
| "funds": [ | Array of funds that should be frozen. At least one element is required. |
| { | Identifies funds - either address or txOut must be specified. |
| "address": <base58 encoded address>, | |
| "txOut" : { | Identifies transaction output that should be frozen. |
| "txId" : <hex string> | Id of the transaction that has created the output. |
| "vout" : <integer> | Output index. |
| }, | |
| "discoveredFrom" : [ | Optional. When absent indicates, that asset was present on paper version of the document. When present indicates, that fund was discovered by the Notary tool. The field contains an array - multiple sources can be listed for single found. Each element of array must contain at least one of the following fields: |
| { | |
| "address" : <base58>, | Addressed that was used to discover this fund. |
| "txOut" : { | TXOUT that was used to discover this fund. Only direct parents are included. |
| "txId" : <hex string> | See above. |
| "vout" : <integer> | See above. |
| }, ... | |
| ], | |
| "documents" : [ { | Optional. An array of scanned court orders or other documents that was used as source for generating machine readable interpretation. |
| "mimeType" : <string> | Required. Recommended value: application/pdf |
| "content" : <binary> | Required. Base64 encoded content of the document |
| "title": <string> | Optional. Title or other description of the document |
| "filename": <string> | Optional. File name of the document. |
| ] | |
| "remarks": string | Optional. Any remarks/instructions for consumer of the blacklist. |

-continued

| | |
|---|---|
| "author": string | Optional. Human readable description of document creator - such as name of the authority. |
| "createdAt": <UTC Timestamp> | Optional. Indicates when machine readable version of court order was created. |
| "signedDate": <UTC timestamp> | Required. Indicates when document was digitally signed by authority. |
| "discoveryDate": UTC | Required. Indicates when children or address discovery process has started. |
| "discoveryBlockHash": <hexencoded> | Required. Hash of the active chain tip that children discovery was completed against (block that was at the end of blockchain at start of discovery). This help 3rd parties with verifying the content of the documents. However, the content of the "funds" is not 100% deterministic because of the following reasons: 1. Funds can include outputs from no-longer active forks. 2. Funds can include outputs created after this block (when discovery takes a long time to complete) |
| } | |

Listing a transaction output that has already been spent has no effect. A block spending such an output will not be invalidated when the order is enforced. Even if a fresh node downloads the blockchain or when an existing node is reindexed, the validity of this output will not change, since they were created before enforceAtHeight. Such outputs are present on the freeze request message for completeness; for example, so an auditor could use them to trace unspent outputs back to root funds that were identified by the authority.

Unfreeze Request Message

| | |
|---|---|
| { | |
| "documentType" : "unfreezeequest" | Identifies the type of document. |
| "courtOrderId" : <Alphanumeric> | Court assigned order id. Might not be unique. |
| "freezeCourtOrderId": <AlphaNumeric> | Human readable reference to order that has frozen the funds, that this court order is unfreezing. Might not be unique. |
| "freezeHash": <hex> | Required. Uniquely identifies freeze request or freeze order that this unfreeze order refers to. See below for steps used to calculate this hash. |
| "validFrom" : <UTC timestamp> | Optional. Specifies when funds should be unfrozen. Not used by Blacklist, since funds are removed from policy blacklist immediately and from consensus blacklists when consensus is reached between miners. |
| "funds" : [ | Optional. When not specified, all funds that were frozen by freezeHash will be unfrozen by this order. When specified, only the explicitly listed funds will be unfrozen. Elements in this array must be present on original freeze request or freeze order. |
| { | |
| "address": <base58 encoded address>, | |
| "txOut" : { | Identifies a transaction output that should be unfrozen. Must be present on original order. |
| "txId" : <hex string> | Id of the transaction that has created the output |
| "vout" : <integer> | Output index. |
| }, | |
| "discoveredFrom": ... | Optional. Same meaning as on freeze request or freeze order. |
| ,.... ] | |
| "document", "remarks", "author", "createdAt", "signedAt" | Optional fields. Same meaning as on freeze request or freeze order. |
| } | |

The parameter freezeHash may be a hash (such as SHA256) of the hash that was input to a signing function of the freeze request document. In one example process:

1. Take freeze request message that was digitally signed (e.g. as specified by JSON Envelope spec);
2. Calculate the hash of the payload by converting the string value to stream bytes using encoding specified in the "encoding" field.
3. Take the output of the previous step and hash it again.
4. Reverse the bytes and convert them to hex encoded string.

Acceptance

When the miner (e.g. blacklist manager) determines that a freeze request (or unfreeze request) is to be accepted, it generates, signs and sends an acceptance message to the freeze administration service. The acceptance is to be signed by the mining node's private key. If the protocol employs minerID or an equivalent miner identifier scheme, the digital signature may use that key pair. One example structure for an acceptance message is:

| | |
|---|---|
| { | |
| "documentType" : "Acceptance" | Identifies the type of document. |
| "freezeHash" : <Alphanumeric> | Required. Hash of the order to which the acceptance applies to, which may be a freeze request message, etc. |
| "desiredHashrateAcceptancePercent": <integer> | Optional An integer value between 0 and 100 that specifies % of the hashrate that should have confirmed acceptance of court order before ConsensusActivation document is created. This field is for informational purposes only. It may be up to the authority or the freeze administration service to determine whether to take this into account or not. |
| "currentBlockHash": <hexencoded> | Required. Current block hash. It proves, that the acceptance document was not created before given block (block hash is not known until block is mined). This field is for informational purpose only. The block listed here could get orphaned. A malicious miner could insert a hash of very old block here. |
| "createdAt": <UTC timestamp> | Required. Indicates when document was created. For informational purposes only. |
| "delegatingKeys" : [ | Optional. An array of signed DelegatedKey documents that links private key used to sign Acceptance to one of the keys used in miner's coinbase documents. Delegation is valid for scope of this Acceptance. |
| <signed DelegatedKeys> | A single signed delegated key. One or more different signature formats may be supported. |
| ] | |
| } | |

In this example, each of the entries in delegatedKeys is to list the public key that corresponds to the private key used to sign the Acceptance document inside the delegatingPublicKey array (it may be permitted to list additional public keys). In other words, the Acceptance document must not include a delegatedKeys document that does not grant signing permission to the key used to sign the Acceptance document.

The delegatedKeys document may be used in cases where the mining node does not want to use the private key associated with the public key used in coinbase transactions. Coinbase transactions are associated with valuable resources and a mining node may not want to use associated keys for other purposes. The delegatedKeys document is a way to link keys used in a coinbase transaction to additional keys that can be used to sign the Acceptance document and for other purposes. The original (delegating) key may be identified either by providing the whole public key or a P2PKH address of the public key. The delegatedKeys document is to be signed by the key used in the coinbase transaction (the delegating key). An example document may take the structure:

| | |
|---|---|
| { | |
| "documentType" : "delegatedKeys" | Identifies the type of document. |
| "createdAt" : UTC timestamp | Indicates the time when delegation has be granted. For informational purposes only. |
| "delegatingPublicKey" : <hex> | Hex encoded public key that is delegating the rights to sign the document to other (delegated) keys. Required if delegatingPublicKeyAddress is not present. If both fields are present, they must match. |
| "delegatingPublicKeyAddress": string | A P2PKH address representing delegating public key. Required if delegatingPublicKey is not present. If both fields are present, they must match. |
| "purpose:" : "authorityCommunication" | Purpose for which the delegated keys can be used. |
| "delegatedPublicKeys" : [ | An array of delegated keys |
| <hexencoded> | A single hex encoded public key which corresponds to a private key that can be used to sign a document instead of delegating key's private key. |
| ] | |
| } | |

Once the freeze administration service determines that a consensus threshold has been reached, it generates, signs and sends a freeze order message or an unfreeze order message. This may be termed a "consensus activation"

document in some cases. The document is signed using a private key associated with the public key of the authority that issued the order to freeze/unfreeze the digital assets. The form of such a document may be:

| | |
|---|---|
| { | |
| "documentType" : "consensusActivation" | Identifies the type of document. |
| "OrderHash" : <Alphanumeric> | Hash of the order to which all acceptances in the document apply to. The "order" may be the freeze request message, an unfreeze request message, or other requests to which a consensus activation may apply. |
| "currentBlockHash": <hexencoded> | Current block hash. It proves, that the acceptance document was not created before given block. This field is for information only. |
| "createdAt": <UTC timestamp> | Required. Indicates when document was created. For informational purposes only. |
| "enforceAtHeight": <Integer> | Block height at which the court order should be enforced on consensus level. |
| "acceptances" : [ { | Arrays of Acceptance documents with additional data. |
| "acceptance" : { ...} | Single acceptance document as described above. |
| "blocks" : [ | Array of blocks that are associated with public key as was used to sign the acceptance. |
| { "blockHeight" : <integer> | Height of the block. |
| "blockHash" : <alphanumeric> | Block hash. |
| }..... | |
| ] | |
| }, .... | |
| ] | |
| } | |

It will be noted that the freeze order or unfreeze order (e.g. consensusActivation document) includes all the acceptances from miners that related to the order and details of the blocks within the window that are associated with a miner that signed that acceptance. This enables each mining node to independently verify that consensus was reached. The enforceAtHeight field indicates the block height at which the transaction outpoints are to be added to the consensus blacklist in order to start implementation of the freeze/unfreeze. The enforceAtHeight value for an unfreeze order must be greater than the enforceAtHeight value in the associated freeze order.

The above document structures are illustrative. It will be appreciated that various changes may be made to remove or add various fields or to alter the encoding or requirements of the documents.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A computer-implemented method of freezing digital assets at a mining node in a blockchain network, wherein the mining node includes one or more processors and memory, the method comprising:

receiving and validating a freeze request message from a freeze administration service, the freeze request message including one or more digital asset identifiers;

adding the one or more digital asset identifiers to a pending blacklist stored at the mining node, wherein new transactions received over the blockchain network that include identifiers on the pending blacklist are rejected by the mining node but new blocks received over the blockchain network that include identifiers on the pending blacklist are acceptable;

receiving and validating a freeze order from the freeze administration service, the freeze order identifying the freeze request message; and responsive to the freeze order, adding the one or more digital asset identifiers to a consensus blacklist, wherein subsequent transactions that include identifiers on the consensus blacklist and subsequent blocks that include identifiers on the consensus blacklist are both rejected by the mining node.

2. The method of claim 1, wherein the digital asset identifiers include transaction outpoint identifiers.

3. The method of claim 1, further comprising, responsive to receiving and validating the freeze request message, generating an acceptance message regarding the freeze request message, digitally signing the acceptance message using a key associated with the mining node to generate a signed acceptance message, and sending the signed acceptance message to the freeze administration service.

4. The method of claim 1, further comprising, after receiving and validating the freeze request message and before receiving and validating the freeze order:

receiving a new transaction over the blockchain network;
determining that the new transaction has at least one of the one or more digital asset identifiers on the pending blacklist as an input and, responsive thereto, rejecting the new transaction.

5. The method of claim 3, further comprising, after receiving and validating the freeze request message and before receiving and validating the freeze order:
identifying a new block mined by another mining node;
determining that at least one transaction in the new block has at least one of the one or more digital asset identifiers on the pending blacklist as an input; and
validating and propagating the new block in accordance with a blockchain protocol governing the blockchain network despite the one or more digital asset identifiers on the pending blacklist.

6. The method of claim 1, further comprising, responsive to the freeze request message, identifying and removing from a mempool of pending transactions any transactions that have at least one of the one or more digital asset identifiers as an input.

7. The method of claim 1, further comprising, before receiving and validating the freeze order, receiving and validating an unfreeze request message from the freeze administration service, the unfreeze request message identifying the freeze request message and, responsive thereto, removing the one or more digital asset identifiers from the pending blacklist.

8. The method of claim 1, further comprising, after receiving and validating the freeze order,
receiving and validating an unfreeze request message from the freeze administration service, the unfreeze request message identifying the freeze request message;
sending an acceptance message to the freeze administration service regarding the unfreeze request message;
later receiving and validating an unfreeze order referencing the unfreeze request message; and, responsive thereto,
removing the one or more digital asset identifiers from the consensus blacklist and from the pending blacklist.

9. A computer-implemented method of freezing digital assets at mining nodes in a blockchain network, wherein each of the mining nodes includes one or more processors and memory, the method comprising:
generating a freeze request message at a freeze administration service, the freeze request message including one or more digital asset identifiers;
transmitting the freeze request message to a plurality of the mining nodes;
receiving and validating acceptance messages in reply to the freeze request message from a set of the plurality of the mining nodes, each acceptance message being associated with one mining node in the set of the plurality of mining nodes;
determining that the set of the plurality of the mining nodes represent more than a consensus threshold quantity of hash power in the blockchain network; and
in response, generating and sending a freeze order to the plurality of mining nodes to cause rejection of new blocks containing transactions that use any of the one or more digital asset identifiers.

10. The method of claim 9, wherein the one or more digital asset identifiers include one or more transaction outpoint identifiers.

11. The method of claim 10, further comprising first receiving an order from a client device, the order including one or more addresses, and identifying the one or more transaction outpoint identifiers based on the one or more addresses using a blockchain address indexer.

12. The method of claim 9, wherein determining that the set of the plurality of the mining nodes represent more than the consensus threshold quantity of hash power in the blockchain network includes determining that a number of blocks in a window of recently-mined blocks that were mined by one of the mining nodes in the set exceeds a threshold consensus number.

13. The method of claim 12, further comprising:
identifying the mining nodes in the set by identifying, for each acceptance message, a respective public key associated with a respective digital signature on that acceptance message; and
detecting an association between a block in the window of recently-mined blocks and one of the mining nodes in the set by matching the respective public key to a public key in a coinbase transaction in that block.

14. The method of claim 9, wherein determining that the set of the plurality of the mining nodes represent more than a consensus threshold quantity of hash power in the blockchain network is triggered by receipt of a new acceptance message.

15. The method of claim 9, wherein determining that the set of the plurality of the mining nodes represent more than a consensus threshold quantity of hash power in the blockchain network is triggered by identifying a newly-mined block on the blockchain network.

16. A computing device for freezing digital assets at a mining node in a blockchain network, the computing device including:
one or more processors;
memory;
computer-executable instructions stored in the memory that, when executed by the one or more processors, cause the processors to:
receive and validate a freeze request message from a freeze administration service, the freeze request message including one or more digital asset identifiers;
add the one or more digital asset identifiers to a pending blacklist stored at the mining node, wherein new transactions received over the blockchain network that include identifiers on the pending blacklist are rejected by the mining node but new blocks received over the blockchain network that include identifiers on the pending blacklist are acceptable;
receive and validate a freeze order from the freeze administration service, the freeze order identifying the freeze request message; and
responsive to the freeze order, add the one or more digital asset identifiers to a consensus blacklist, wherein subsequent transactions that include identifiers on the consensus blacklist and subsequent blocks that include identifiers on the consensus blacklist are both rejected by the mining node.

17. The computing device of claim 16, wherein the instructions, when executed, are to further cause the processors to, after receiving and validating the freeze request message and before receiving and validating the freeze order:
receive a new transaction over the blockchain network;
determine that the new transaction has at least one of the one or more digital asset identifiers on the pending blacklist as an input and, responsive thereto, reject the new transaction.

18. The computing device of claim 16, wherein the instructions, when executed, are to further cause the processors to, after receiving and validating the freeze request message and before receiving and validating the freeze order:

identify a new block mined by another mining node;

determine that at least one transaction in the new block has at least one of the one or more digital asset identifiers on the pending blacklist as an input; and validate and propagate the new block in accordance with a blockchain protocol governing the blockchain network despite the one or more digital asset identifiers on the pending blacklist.

19. A tangible computer-readable medium storing processor-executable instructions for freezing digital assets at a mining node in a blockchain network, the processor-executable instructions including instructions that, when executed by one or more processors, cause the processors to:

receive and validate a freeze request message from a freeze administration service, the freeze request message including one or more digital asset identifiers;

add the one or more digital asset identifiers to a pending blacklist stored at the mining node, wherein new transactions received over the blockchain network that include identifiers on the pending blacklist are rejected by the mining node but new blocks received over the blockchain network that include identifiers on the pending blacklist are acceptable;

receive and validate a freeze order from the freeze administration service, the freeze order identifying the freeze request message; and responsive to the freeze order, add the one or more digital asset identifiers to a consensus blacklist, wherein subsequent transactions that include identifiers on the consensus blacklist and subsequent blocks that include identifiers on the consensus blacklist are both rejected by the mining node.

20. A computing device freezing digital assets at mining nodes in a blockchain network, the computing device including:

one or more processors;

memory;

computer-executable instructions stored in the memory that, when executed by the one or more processors, cause the processors to:

generate a freeze request message at a freeze administration service, the freeze request message including one or more digital asset identifiers;

transmit the freeze request message to a plurality of the mining nodes;

receive and validate acceptance messages in reply to the freeze request message from a set of the plurality of the mining nodes, each acceptance message being associated with one mining node in the set of the plurality of mining nodes;

determine that the set of the plurality of the mining nodes represent more than a consensus threshold quantity of hash power in the blockchain network; and in response, generate and send a freeze order to the plurality of mining nodes to cause rejection of new blocks containing transactions that use any of the one or more digital asset identifiers.

* * * * *